(12) United States Patent
Baruc et al.

(10) Patent No.: US 11,045,286 B2
(45) Date of Patent: Jun. 29, 2021

(54) DENTAL IMPLANTS

(71) Applicant: NOGA MEDICAL PRODUCTS LTD., Shlomi (IL)

(72) Inventors: Daniel Baruc, Nahariya (IL); Lior Hazan, Shlomi (IL)

(73) Assignee: NOGA MEDICAL PRODUCTS LTD., Shlomi (IL)

( * ) Notice: Subject to any disclaimer, the term of this patent is extended or adjusted under 35 U.S.C. 154(b) by 0 days.

(21) Appl. No.: 15/303,030

(22) PCT Filed: Apr. 21, 2015

(86) PCT No.: PCT/IL2015/050423
§ 371 (c)(1),
(2) Date: Oct. 10, 2016

(87) PCT Pub. No.: WO2015/162612
PCT Pub. Date: Oct. 29, 2015

(65) Prior Publication Data
US 2017/0027669 A1    Feb. 2, 2017

Related U.S. Application Data

(60) Provisional application No. 61/982,866, filed on Apr. 22, 2014.

(51) Int. Cl.
*A61C 8/00* (2006.01)
(52) U.S. Cl.
CPC ............ *A61C 8/0072* (2013.01); *A61C 8/006* (2013.01); *A61C 8/008* (2013.01); *A61C 8/0024* (2013.01);
(Continued)

(58) Field of Classification Search
CPC ...... A61C 8/0072; A61C 8/0086; A61C 8/006; A61C 8/0069; A61C 8/0074; A61C 8/0024; A61C 8/0075; A61C 8/008
(Continued)

(56) References Cited

U.S. PATENT DOCUMENTS 4,488,875 A    12/1984  Niznick
4,713,004 A    12/1987  Linkow et al.
(Continued)

FOREIGN PATENT DOCUMENTS

CA    2600556    9/2006
CN    1117549    8/2003
(Continued)

OTHER PUBLICATIONS

Supplementary European Search Report and the European Search Opinion dated Dec. 7, 2017 From the European Patent Office Re. Application No. 15783860.8. (8 Pages).
(Continued)

*Primary Examiner* — Yogesh P Patel
*Assistant Examiner* — Stephen R Sparks
(74) *Attorney, Agent, or Firm* — Pearl Cohen Zedek Latzer Baratz LLP

(57) ABSTRACT

A dental implant, including a generally cylindrical body having a proximal open end and a distal closed end and an externally threaded surface, a socket extending distally from the proximal end and terminating at a proximally facing shoulder and an internally threaded hole extending distally from the proximally facing shoulder and a curved portion formed between the proximally facing shoulder and the internally threaded wall.

34 Claims, 13 Drawing Sheets

(52) U.S. Cl.
CPC .......... *A61C 8/0069* (2013.01); *A61C 8/0074* (2013.01); *A61C 8/0075* (2013.01); *A61C 8/0086* (2013.01)

(58) Field of Classification Search
USPC .................................................. 433/169, 174
See application file for complete search history.

(56) References Cited

U.S. PATENT DOCUMENTS

| | | | |
|---|---|---|---|
| 4,854,872 A | 8/1989 | detsch | |
| 5,022,860 A | 6/1991 | Lazzara et al. | |
| 5,100,323 A | 3/1992 | Friedman | |
| 5,213,500 A * | 5/1993 | Salazar ................ | A61C 8/0018 433/169 |
| 5,302,125 A | 4/1994 | Xownacki et al. | |
| 5,368,483 A * | 11/1994 | Sutter .................. | A61C 8/0022 433/173 |
| 5,376,004 A | 12/1994 | Mena | |
| 5,527,182 A | 6/1996 | Willoughby | |
| 5,564,924 A | 10/1996 | Kwan | |
| 5,733,122 A | 3/1998 | Gordon | |
| 5,779,480 A | 7/1998 | Groll et al. | |
| 5,827,062 A | 10/1998 | Driskell et al. | |
| 5,829,977 A | 11/1998 | Rogers et al. | |
| 5,890,902 A * | 4/1999 | Sapian ................ | A61C 8/0048 433/173 |
| 5,927,979 A | 7/1999 | Misch et al. | |
| 5,931,675 A | 8/1999 | Callan | |
| 5,989,028 A * | 11/1999 | Niznick ............... | A61C 8/0022 433/173 |
| 6,497,573 B2 | 12/2002 | Wagner et al. | |
| 6,500,003 B2 * | 12/2002 | Nichinonni ............ | A61C 8/005 433/173 |
| 6,866,508 B2 | 3/2005 | Aldecoa | |
| 6,997,710 B2 | 2/2006 | Fernendes et al. | |
| 7,758,344 B2 | 7/2010 | Gogarnoiu | |
| 7,959,439 B2 | 6/2011 | Bulloch et al. | |
| 8,038,442 B2 | 10/2011 | Hurson | |
| 8,043,089 B2 | 10/2011 | Bulard et al. | |
| 8,197,255 B2 | 6/2012 | Fromovich et al. | |
| 8,267,687 B2 | 9/2012 | Kast et al. | |
| 8,371,851 B2 | 2/2013 | Smith et al. | |
| 8,382,477 B2 | 2/2013 | Philibin | |
| 8,425,231 B1 | 4/2013 | Hochman et al. | |
| 8,540,512 B2 | 9/2013 | Linder et al. | |
| 8,612,037 B2 | 12/2013 | Powell et al. | |
| 8,636,511 B2 | 1/2014 | Porter et al. | |
| 9,717,571 B2 * | 8/2017 | Goodman ............. | A61C 8/0063 |
| 9,757,214 B2 * | 9/2017 | Guenter ............... | A61C 8/0022 |
| 2002/0039718 A1 | 4/2002 | Kwan | |
| 2004/0175673 A1 | 9/2004 | Zickman et al. | |
| 2006/0014120 A1 | 1/2006 | Sapian | |
| 2007/0202463 A1 * | 8/2007 | Sanchez ............... | A61C 8/005 433/173 |
| 2009/0246734 A1 | 10/2009 | Bar-Shalom | |
| 2009/0298013 A1 | 12/2009 | Baruc | |
| 2009/0305190 A1 | 12/2009 | Zipprich | |
| 2010/0209877 A1 * | 8/2010 | Hogan ................. | A61C 8/0001 433/214 |
| 2011/0244425 A1 | 10/2011 | Wiener | |
| 2012/0077149 A1 | 3/2012 | Ospelt et al. | |
| 2012/0077150 A1 * | 3/2012 | Goodman ............. | A61C 8/006 433/173 |
| 2013/0004915 A1 * | 1/2013 | Bellanca .............. | A61C 8/0018 433/173 |
| 2013/0309632 A1 | 11/2013 | Sanders | |
| 2016/0113738 A1 * | 4/2016 | Guenter ............... | A61C 8/0089 433/174 |
| 2016/0193017 A1 * | 7/2016 | Kim ..................... | A61C 8/0063 433/201.1 |
| 2016/0206407 A1 * | 7/2016 | Kim ..................... | A61C 8/006 |

FOREIGN PATENT DOCUMENTS

| | | |
|---|---|---|
| EP | 0263274 | 4/1988 |
| EP | 1459700 | 9/2004 |
| EP | 2127612 | 12/2009 |
| EP | 2228032 | 9/2010 |
| EP | 1523284 | 3/2011 |
| EP | 2266498 | 1/2012 |
| EP | 2662052 | 11/2013 |
| WO | WO 98/03130 | 1/1998 |
| WO | WO 00/28914 | 5/2000 |
| WO | WO 2002/015813 | 2/2002 |
| WO | WO 2006/000289 | 1/2006 |
| WO | WO 2007/126586 | 11/2007 |
| WO | WO 2008/157137 | 12/2008 |
| WO | WO 2011/034780 | 3/2011 |
| WO | WO 2011/055358 | 5/2011 |
| WO | WO 2012/039819 | 3/2012 |
| WO | WO 2012/066524 | 5/2012 |
| WO | WO 2015/162612 | 10/2015 |

OTHER PUBLICATIONS

International Preliminary Report on Patentability dated Nov. 3, 2016 From the International Bureau of WIPO Re. Application No. PCT/IL2015/050423. (10 Pages).
International Search Report and the Written Opinion dated Oct. 1, 2015 From the International Searching Authority Re. Application No. PCT/IL2015/050423.
Invitation to Pay Additional Fees dated Jul. 6, 2015 From the International Searching Authority Re. Application No. PCT/IL2015/050423.
Communication Pursuant to Article 94(3) EPC dated Oct. 24, 2019 From the European Patent Office Re. Application No. 15783860.8. (6 Pages).
Office Action dated Mar. 26, 2020 From the Israel Patent Office Re. Application No. 248308 and Its Translation Into English. (7 Pages).
Communication Pursuant to Article 94(3) EPC dated Aug. 10, 2020 From the European Patent Office Re. Application No. 15783860.8. (6 Pages).

* cited by examiner

DENTAL IMPLANTS

RELATED APPLICATIONS

This application is a National Phase of PCT Patent Application No. PCT/IL2015/050423 having International filing date of Apr. 21, 2015, which claims the benefit of priority under 35 USC § 119(e) of U.S. Provisional Patent Application No. 61/982,866 filed on Apr. 22, 2014. The contents of the above applications are all incorporated by reference as if fully set forth herein in their entirety.

FIELD AND BACKGROUND OF THE INVENTION

The present invention, in some embodiments thereof, relates to the field of dental implants and more particularly, to dental implants and their mating abutments.

Dental implants are used for restoration of teeth using artificial components. The artificial components include a dental implant that supports a prosthetic tooth and an abutment, which is connected to the dental implant. Various connection mechanisms are known in the art for providing a connection interface between the dental implant and the abutment. There are external and internal connection platforms. In an external connection platform, the dental implant is formed with a hexagonal protrusion for connection with the abutment. In an internal connection platform, the dental implant is formed with a socket for receiving the abutment.

SUMMARY OF THE INVENTION

There is provided in accordance with an embodiment of the present invention a dental implant, including a generally cylindrical body having a proximal open end and a distal closed end and an externally threaded surface, a socket extending distally from the proximal end and terminating at a proximally facing shoulder and an internally threaded hole extending distally from the proximally facing shoulder and a curved portion formed between the proximally facing shoulder and the internally threaded wall.

Providing a potential advantage, the curved portion reduces stress concentration along a perimeter of the socket in order to strengthen a wall thickness formed between the socket and the externally threaded surface.

Optionally, the curved portion has a radius of 0.3 mm.

In accordance to an embodiment of the present invention, the socket is hexagon-shaped and has a diameter of approximately 2.44 mm.

Providing a potential advantage, the diameter of the socket remains substantially identical independently from change of size of the dental implant.

In accordance with an embodiment of the present invention, a dental implant assembly kit, including a first dental implant having at its proximal end a first outer diameter, which is larger than 3.3 mm, and a first connection socket of a first diameter, a second dental implant having at its proximal end a second outer diameter, which is smaller than or equal to 3.3 mm and a second connection socket of the first diameter, an abutment having a connection portion of a second diameter and an abutment screw of a third diameter, wherein the connection portion of a second diameter and the abutment screw of a third diameter are compatible with both the first dental implant and the second dental implant.

According to an aspect of some embodiments of the present invention, there is provided a dental implant having a generally cylindrical body and a bore extending distally along a longitudinal axis into the body from a proximal end of the body; the bore having a bore wall defining: a socket region, an internally threaded hole distal to and radially inset from the wall of socket region, and an interface portion between the socket region and the internally threaded hole; wherein a shape of the interface portion comprises a change in angle from an orientation at a proximal side of the interface portion to an orientation at a distal side of the interface portion; wherein the change in angle is distributed along the longitudinal axis and within a longitudinal plane containing the longitudinal axis; and wherein the extent of the distribution is sufficient to reduce stress concentration for prevention of primary stress failure at a region of wall between the socket region and the externally threaded surface.

According to some embodiments of the invention, each portion of the interface portion which changes angle by 15° within the longitudinal plane is over a minimum distance along the bore wall of at least 38 μm.

According to some embodiments of the invention, magnitude of the change in angle is between 15° and 85°.

According to some embodiments of the invention, magnitude of the change in angle is no more than 75°.

According to some embodiments of the invention, the interface portion directly connects a bore wall portion extending along the longitudinal axis with the slope of a chamfer leading distally into the internally threaded hole.

According to some embodiments of the invention, the shape comprising the change of angle is curved, and the radius of curvature is at least 150 μm.

According to some embodiments of the invention, the radius of curvature is at least 150 μm for each section of wall which is at least 26 μm long.

According to some embodiments of the invention, the shape comprising the change of angle is curved, and the radius of curvature is at least 300 μm.

According to some embodiments of the invention, the radius of curvature is at least 300 μm for each section of wall which is at least 26 μm long.

According to some embodiments of the invention, the region of the change in angle is non-reversing with respect to the direction of change.

According to some embodiments of the invention, the region of the change in angle is monotonically increasing with respect to the direction of change.

According to some embodiments of the invention, the socket region comprises a cross-sectional form having hexagonal symmetry.

According to some embodiments of the invention, the socket region has a diameter of about 2.44 mm.

According to some embodiments of the invention, the region of the change in angle is restricted to not more than 90° of the bore wall circumference.

According to some embodiments of the invention, the region of the change in angle is present around at least 270° of the bore wall circumference.

According to some embodiments of the invention, the region of the change in angle is present around between 90° and 270° of the bore wall circumference.

According to an aspect of some embodiments of the present invention, there is provided a dental implant assembly kit, comprising: a first dental implant having a first maximum outer diameter which is smaller than or equal to 3.3 mm, and a first connection socket of a first inner diameter; a second dental implant having a second maximum outer diameter, which is at least 0.4 mm larger than the first maximum outer diameter, and a second connection socket having the first inner diameter; and an abutment assembly having a connection portion and an abutment screw, wherein the connection portion and the abutment screw are compatible for use with the connection socket of both the first dental implant and the second dental implant.

According to some embodiments of the invention, the connection socket is substantially identical independently from differences between the first and second maximum outer diameters.

According to some embodiments of the invention, the first dental implant comprises a curved region which relieves stress concentration near a base of a wall portion formed between the first outer diameter and the first inner diameter.

According to an aspect of some embodiments of the present invention, there is provided a method of selecting an implant and abutment for implantation into a jaw, comprising: selecting a plurality of abutment and abutment screw sets, the corresponding members of each set having the same diameters for connecting to a dental implant; providing a plurality of implants having maximum outer diameters spanning at least a range of 0.45 mm, wherein a lower limit of the range is 3.5 mm or less; and selecting the smallest and the largest implant from the provided implants and implanting each into the jaw, together with the selected abutment and abutment screw sets.

According to some embodiments of the invention, the lower limit of the range is 3.3 mm or less.

According to some embodiments of the invention, the lower limit of the range is 3.4 mm or less.

According to some embodiments of the invention, the span of the range is at least 1.0 mm.

According to some embodiments of the invention, the span of the range is at least 1.7 mm.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example, and for purposes of illustrative discussion of embodiments of the invention. In this regard, the description taken with the drawings makes apparent to those skilled in the art how embodiments of the invention may be practiced.

In the drawings:

FIGS. 10A-10I schematically illustrate for comparison dental assemblies comprising two alternative interface regions, of which a first region includes a stress-focusing interior corner while a second region replaces the corner with a stress-diffusing curve; wherein FIGS. 10B-10C, 10F-10G and 10I are according to some exemplary embodiments of the invention.

DESCRIPTION OF SPECIFIC EMBODIMENTS OF THE INVENTION

Figure 1:
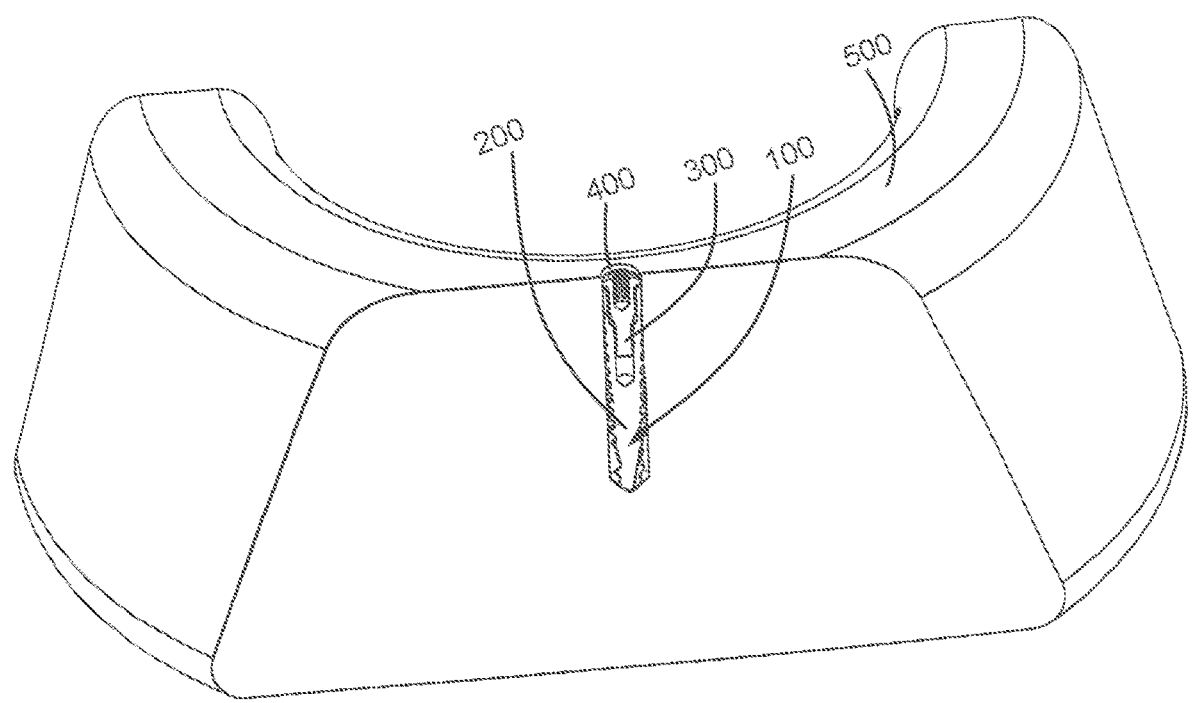
FIG. 1 schematically illustrates a dental implant with an internal connection platform connected to an abutment by an abutment screw, shown within a jawbone of a patient, according to some exemplary embodiments of the invention.

The present invention, in some embodiments thereof, relates to the field of dental implants and more particularly, to dental implants and their mating abutments.

Overview

An aspect of some embodiments of the current invention relates to manufacturing modifications to a small outer-diameter dental implant allowing it to be used with a standard diameter internal connection platform.

In some embodiments, an implant kit including implants of a plurality of outer diameters is optionally provided with and/or made to be compatible with a single set of abutment and abutment screw hardware. The dental implants of the set have outer diameters ranging from, for example, 3.3-6 mm in diameter, or another range of outer diameters. Additionally or alternatively, an abutment and/or abutment screw specified for use with a larger outer diameter implant (for example, an implant of 3.75-6 mm in diameter, or of another outer diameter) is used with a dental implant of an outer diameter less than 3.75 mm; for example, a small-diameter dental implant having an outer diameter of 3.3 mm. In some embodiments, a small-diameter implant has an outer diameter (measured at the proximal end of the implant) other than 3.3 mm; for example, a diameter of 3.20 mm, 3.25 mm, 3.35 mm, 3.40 mm, 3.45 mm, 3.5 mm, or another larger, smaller, or intermediate outer diameter.

It is a potential advantage for savings of cost and/or complexity to provide a single size of internal connection platform for use with dental implants over a wide range of implant outer diameters. In some embodiments of the current invention, an internal connection platform of standard size for a medium and/or large outer diameter implant is provided to a small diameter implant.

However, although larger diameter abutment hardware is potentially stronger and/or less prone to direct failure, reduction of an implant outer diameter while maintaining the same inner bore diameter for the internal connection platform results in a reduction of wall thickness. Potentially (and particularly for the case of a small-diameter implant), the reduction reaches a limit at which eventual mechanical failure at some region along the wall of the implant becomes likely.

In some embodiments of the invention, an implant internal connection platform suitable for abutment connection to an implant having an outer diameter of 3.75 mm-5 mm diameter is adapted for use with a smaller outer implant diameter, for example, an outer implant diameter as small as 3.3 mm, or another diameter, for example, 3.2 mm. Optionally, the adaptation is while maintaining a fixed size for an abutment socket and/or internally threaded abutment screw receiving hole. In some embodiments, the adaptation comprises a change to the manufacture of a region joining an abutment socket and an internally threaded abutment screw receiving hole. Optionally, the change to manufacture comprises providing a curved region extending between the abutment socket (and/or an implant region shaped as part of the manufacture of the abutment socket), and the abutment screw receiving hole (and/or an implant region shaped as part of the manufacture of the abutment screw receiving hole). Optionally, the curved region referred to is curved such that a radius of the bore of the internal connection platform decreases with increasing longitudinal depth, the decrease in diameter being non-linear (for example, arc-shaped) as a function of longitudinal depth.

In some embodiments of the current invention, a family of dental implants is provided, in which all members of the family have an internal connection platform sized to accommodate and abutment and/or abutment screw of identical dimensions. The smaller-diameter members (optionally, but not necessarily, any or all members) of the dental implant family moreover are provided with a curved region of the internal connection platform located between the abutment receiving socket and the threaded abutment screw receiving bore. In some embodiments, the curved region extends between a region of bore wall which extends straight along the longitudinal axis of the implant, and a region of bore wall which is oblique (for example, at a 30°, 45°, 60°, or other greater, smaller, or intermediate angle) to the longitudinal axis of the implant.

It is to be understood that the particular inner and outer diameters described for implants, abutments, and/or abutment screws are not necessarily limiting, and optionally varied outside the ranges specifically mentioned, for example, according to strengths of materials and/or performance properties of the design. For example, in embodiments where a standard abutment diameter is reduced by 0.2 mm, the outer diameter of implants (for example, of the small implant) is optionally reduced correspondingly. Optionally, an implant wall thickness is further reduced, for example, in a design manufactured with a stronger construction material.

Before describing in more detail the curved region of the implant, certain details of implant internal connection platform construction, in some embodiments of the invention, are now briefly discussed. The details relate to methods of formation of internal implant surfaces which, in some embodiments, the curved region is nearby and/or adjoins. The following description of manufacturing techniques for some embodiments of the invention is exemplary and not necessarily limiting.

In some embodiments, the internal bore of a dental implant comprises an upper bore portion and a lower bore portion. Optionally, the upper bore portion comprises a socket (for example, a hexagonal socket, a socket having substantially hexagonal symmetry, and/or a socket of another non-circular shape) for receiving an abutment, and the lower bore portion comprises an internally threaded hole for receiving an abutment screw by which the abutment is secured to the implant.

In some embodiments, an interface zone is positioned between the upper and lower bore portions, where the features of one give way to the features of the other. For example, the socket of the upper bore portion is non-circular in profile, to rotationally stabilize and/or orient the abutment. In some embodiments, the lower bore portion is circularly threaded internally. The two bore forms, their methods of manufacture, and/or their method of use place different constraints on the design of the bore features within the interface zone. In some embodiments, the interface zone comprises and/or leads into a feature extending from a socket and/or from an internally threaded hole, for example, a guide hole, cleaning hole, chip-receiving hole, and/or a chamfer. Optionally, a feature extending from a socket and/or from an internally threaded hole is considered as a portion of the upper bore portion of lower bore portion.

In some embodiments, an abutment socket is manufactured by drilling a round, blind guide hole, followed by use of a rotary broaching tool, shaped to the cross-sectional form of the abutment outer wall. The rotary broaching tool chisels chips from the walls of the guide hole by being repeatedly "wobbled" through an off-axis circular motion under longitudinal force (rather than, for example, by spinning in the guide hole, as with drilling).

Optionally, the dimensions of the guide hole and the broached hole are selected together to produce successful results in manufacturing and/or operation. For example, in some embodiments, the guide hole, and/or a hole made and/or cleaned by re-drilling after broaching, extends somewhat distally beyond the broached region, for example to receive and/or assist in freeing broaching chips. Broaching tool performance is critically affected by the relative diameters of the guide hole and the broaching tool. According, for example, to details of a chosen design, the guide hole is optionally a predefined number of microns larger than the minimal diameter of the broaching tool. As a result, there is optionally a slight bowing-out of the socket sides near the middle of each side. Alternatively—for example in order to allow precisely straight socket sides—the guide hole is predefined to be the same size as or a selected amount smaller than the broaching tool.

With respect to the threaded lower bore portion, manufacturing specifications of an implant design often specify a chamfered entry region (of, for example, 120°, 90°, or another chamfer-to-chamfer angle). This is provided, for example, to allow accurate manufacturing and/or to assist in the operation of the thread itself.

The inventors have observed that as the dental implant wall is thinned, a risk of mechanical failure in the interface zone where the upper and lower bore portions meet potentially increases. In particular, as dental implant outer diameter is made smaller (for example, approaching a wall thickness of 0.29 mm, and/or a smaller wall thickness) while accommodating a fixed size internal connection platform, a region connecting the upper and lower bore portions becomes more prone to failure. More particularly still, failure risk increases at an angled portion where a distal portion of the socket, guide hole, and/or cleaning hole of the upper bore portion meets a chamfer which serves as the proximal entry to the threaded lower bore portion. Potentially, the risk of failure at the angled portion is increased disproportionately to the rest of the thinned wall, for example due to stress focusing.

An aspect of some embodiments of the current invention relates to constructing an interface region of a dental implant bore with a curve that continuously connects two adjoining regions having different wall orientations. In particular, the interface region connects a portion of longitudinally-oriented distal bore wall leading from an abutment-receiving bore portion to the slope of a proximal chamfer for a bore region which is threaded to receive an abutment screw.

In some embodiments of the current invention, a first bore region having a first wall orientation (for example, a wall running longitudinally along the bore axis) is joined to a second bore region having a second wall orientation (for example, a wall region angled away from the longitudinal axis by a chamfer) through a third bore region which curves between the first wall orientation and the second wall orientation. In some embodiments, the first and second bore regions are distinguished by a difference in diameter, and the third bore region assumes a range of orientations in passing between them. The curvature and/or orientations referred to in discussing the third bore region are within a plane passing along a longitudinal axis of the implant bore, except as otherwise indicated.

Potentially, the curvature of the third bore region acts to reduce stress focusing which otherwise occurs, for example, if the first and second regions meet directly at their two distinct angles, and/or are joined directly by a straight wall segment. In particular, the stress focusing at an interior angle so-formed is potentially relived. For example, the curvature of the third bore region receives and distributes stress across a larger region of the implant body than a straight angle join does. A potential advantage of this stress redistribution is to reduce a likelihood of mechanical failure within the region where the first and second bore regions join and/or are joined. The likelihood is reduced, for example, by reducing the induction of material fatigue and/or by spreading force so that a strain and/or stress limit is less likely to be reached upon application of forces during use and/or implantation.

In some embodiments, the reduction of stress focusing by a curvature of the third bore region reduces a peak stress and/or strain experienced under load (for example, a load within 20% of a rated load) by a factor of 4×, relative to stress and/or strain induced in an equivalent region of an implant not provided with a stress-relieving curvature. In some embodiments, the reduction of stress is by another factor, for example, 2×, 3×, 6×, 8×, 16×, or another greater, lesser, and/or intermediate stress reduction factor. In some embodiments, reduction of stress focusing by a curvature is sufficient to transfer an initial and/or primary failure point to a portion of the implant away from the curve; for example, to transfer it at least 1 mm, 2 mm, 3 mm, or another distance longitudinally away from the curved region. Optionally, the reduction of stress focusing is sufficient to reduce a probability of primary failure occurring in the region of curvature (for a given potential failure load) by a factor of at least, for example, 2×, 4×, 8×, 16×, 32×, or another greater, smaller, or intermediate factor.

It is to be understood, in relation to the curvature of the wall of third bore region (also referred to as "curve 216", "curved portion 216", and "curved region 216" herein), that the longitudinal curvature referred to is an example used to describe some embodiments of the invention. Optionally, the curve is replaced by any feature of the wall shape which distributes an angle change (more particularly, an angle change due to an internal angle) between a first wall portion and a second wall portion over a substantially longer extent than a direct meeting of the two portions provides, so as to relieve potential stress concentration acts as a primary cause of implant failure. For example, the longitudinal curvature comprises a region of continuous slope change, a region of continuous slope changes interrupted by one or more straight segments, and/or a region where no slope change (continuous or discontinuous) is above a certain change in angle for a certain minimum distance considered. Optionally, for example, a curve 216 is replaced by a shape comprised piecewise of linear segments, where the angle change between each segment is nevertheless sufficiently small (for example, 5°, 10°, 15°, or another larger, smaller, or intermediate number) that stress is distributed along the extent of the shape.

In some embodiments, the proximal side of the first bore region begins at a longitudinal position continuing from and/or immediately distal to a non-circular bore region (for example, an abutment socket). For example, the non-circular bore region comprises a substantially hexagonal cross-section, or another cross-sectional shape. Optionally, the first bore region continues straight distally along a longitudinal axis of the implant until it reaches the third, curved bore region.

In some embodiments, the second bore region is distal to the first bore region (that is, deeper within the cavity defined by the internal connection platform of the implant), and is defined by a chamfer or other shape that angles away from the longitudinal axis of the implant. For example, the chamfer angles radially inward at an angle of 60° from the longitudinal axis. Optionally, the radially inward angle is, for example, 30°, 45°, or another larger, smaller, and/or intermediate angle. In some embodiments, the second bore region is smaller in diameter than the smallest diameter of the first bore region, for example, by about 0.1 mm, 0.2 mm, 0.3 mm, 0.4 mm, or another larger, smaller, and/or intermediate distance.

In some embodiments, the third bore region continuously curves between the wall orientations of the first and second bore regions. For example, the curvature of the third bore region is tangent to the wall of the first bore region at a proximal side, and tangent to the wall of the second bore region at a distal side. Additionally or alternatively, the third bore region subtends an internal angle which would otherwise exist due to a transition between a wider and a narrower bore. In some embodiments, the third bore region curves through about 60°. Optionally, the wall of the third bore region curves through another angle, for example, about 30°, about 45°, or through another greater, smaller, and/or intermediate angle. In some embodiments, the wall of the third bore region curves through an angle which is at least 15°, 30°, 45°, 60°, or another greater, lesser, and/or intermediate angle. Optionally, the wall of the third bore region curves through an angle which is no more than 70°, 75°, 80°, 85°, 89°, 90°, or another greater, lesser, or intermediate angle. In some embodiments, the curved region directly leads into a chamfer of the internally threaded hole, without an intervening ledge or bend.

Optionally, the third bore region curves with a constant radius of curvature between the bore walls of the first and second bore regions. For example, the third bore region curves with a radius of curvature of about 300 μm. Optionally the third bore region curves with a another radius of curvature; for example, about 150 μm, 200 μm, 250 μm, 400 μm, 500 μm, or another larger, smaller, or intermediate radius of curvature.

In some embodiments, the third bore region curves with a variable radius of curvature which ranges between, for example, 150 μm and 500 μm. Optionally, the radius of curvature ranges within, for example, 100 μm-400 μm, 250 μm-350 μm, 200 μm-400 μm, 100 μm-600 μm, 300 μm-1000 μm, 300 μm-substantially flat, or another range having the same, larger, smaller, and/or intermediate bounds. In some embodiments, a curvature is specified other than as one or more segments each having a radius of curvature; in such cases, it is to be understood that "radius of curvature" refers to the nearest available average radius of curvature for a segment. Optionally, the nearest available average radius of curvature is selected to define a circumference passing along the wall within some reasonable tolerance range, for example, a tolerance of ±1 μm, ±2 μm, ±4 μm, ±5 μm, or another greater, smaller, and/or intermediate tolerance range. Optionally, the length of segment to be fitted for determining a particular average radius of curvature is the longest segment fitting within a selected tolerance value.

In some embodiments, the third bore region comprises a longitudinally oriented extent between the bore walls of the first and second bore regions, along which longitudinally oriented extent the angle of the bore wall changes. Optionally, each distance over which a change comprising a threshold angle of 5°, (or another threshold angle; for example, 1°, 2°, 10°, 15°, or another larger, smaller, or intermediate threshold angle) occurs through a corresponding average radius of curvature over the minimal wall extent subtending the threshold angle of at least about 300 μm. Optionally, the criterion is met for another minimum radius of curvature; for example, at least about 150 μm, 200 μm, 250 μm, 400 μm, 500 μm, or another larger, smaller, or intermediate radius of curvature.

Additionally or alternatively, for any (e.g., at least 95%) of the given threshold angles and average radii of curvature, each change of angle along the wall comprising the threshold angle occurs through a corresponding minimally bounding along-the-wall distance. The distance is, for example, at least minimum radius of curvature$\cdot\sin$(threshold angle), which, for a sufficiently small value of threshold angle, approximates (but is shorter than) the length of a straight line subtending the given angle. Optionally, the true straight line distance is a lower bound of the minimally bounding distance. In some embodiments, the criterion of minimal wall length is met at every angle above threshold angle (for example, for some function relating the minimal wall length and the threshold angle).

In some embodiments, another distance criterion is met which ensures that a sharp bend through an angle large enough to potentially produce failure-inducing stress focusing is avoided.

In some embodiments, for example, a longitudinal change of angle of 10° occurs along a wall distance of at least about 26 μm, approximating a radius of curvature of about 150 μm. Also for example, a longitudinal change of angle of 15° occurs along a wall distance of at least about 77 μm, approximating a minimum average radius of curvature of about 300 μm; or along a wall distance of at least about 38 μm, approximating a minimum average radius of curvature of about 150 μm. In another example, a longitudinal change of angle of 5° occurs along a wall distance of at least about 26 μm, approximating a radius of curvature of about 300 μm.

In some embodiments, the third bore region also comprises a circumference (optionally, a curved circumference; for example, the bore circumference) in a plane transverse to the central longitudinal axis of the implant. Optionally, the longitudinally extending, stress-relieving curvature (and/or non-abrupt change in orientation) is provided around the whole circumference of this curvature. Alternatively, the longitudinally extending curvature is provided around a portion of this circumference, for example, around 270°, 180°, 90°, or another larger, smaller, or intermediate portion. Optionally, the longitudinally extending curvature is provided in one, two, three, four, five, six, or more radially distinct sections around the transverse circumference. For example, a distinct curved section is provided under each corner of a hexagonal socket, centrally under each face of the socket, and/or another arrangement. Potentially, curved regions shield non-curved regions from stress sufficiently to prevent stress, strain, and/or fatigue failure.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Reference is now made to FIGS. 10A-10I, which schematically illustrate for comparison dental assemblies 100 comprising two alternative interface regions 1010, 1020, of which a first region 1010 includes a stress-focusing interior corner 217 while a second region 1020 replaces the corner 217 with a stress-diffusing curve 216, according to some exemplary embodiments of the invention.

Figure 10A:
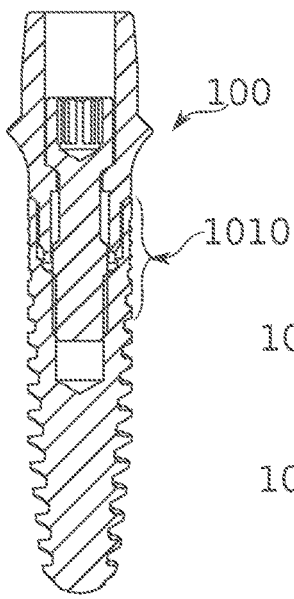
Figure 10B:
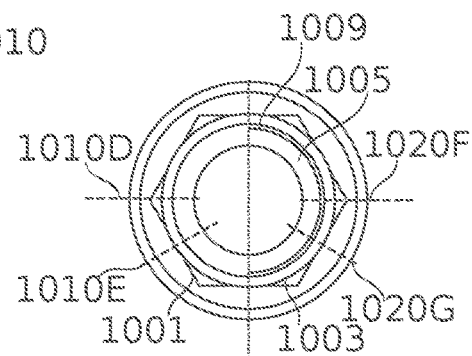
Figure 10C:
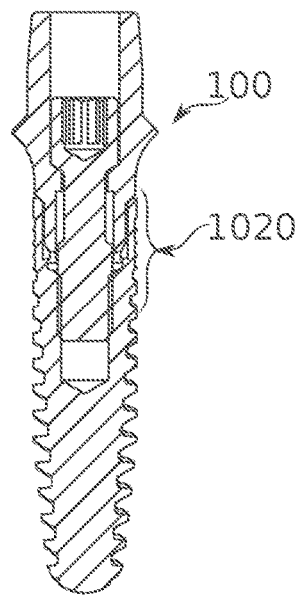
Figure 10D:
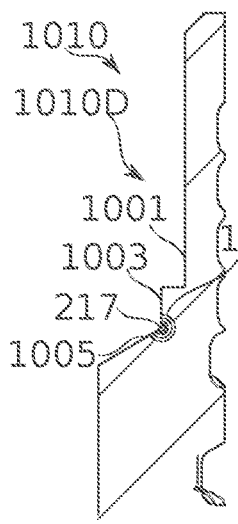
Figure 10E:
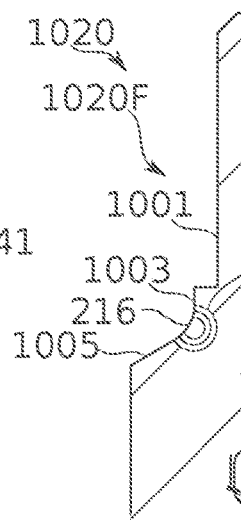

FIGS. 10A and 10C comprise full longitudinal cross-sections of implant assembly 100. FIG. 10C in particular illustrates implant assembly 100 comprising a curves section 216, according to some exemplary embodiments of the invention.

Figure 10F:
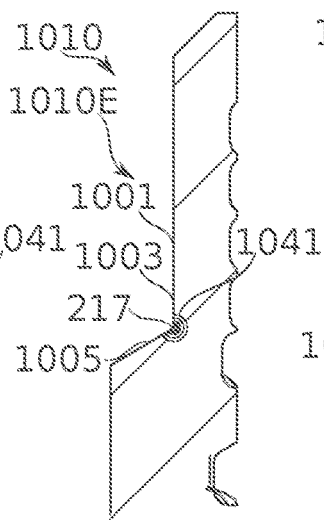
Figure 10G:
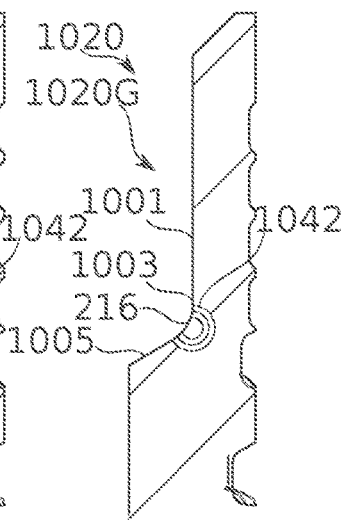
Figure 10H:
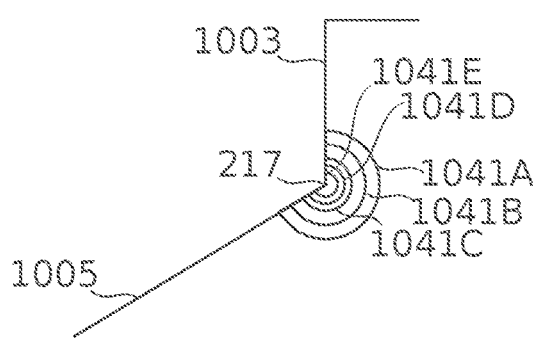
Figure 10I:
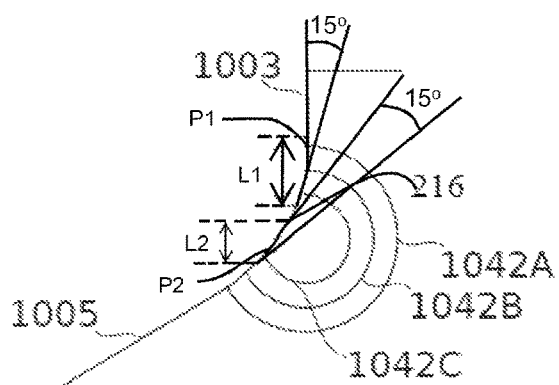

FIGS. 10A and 10C include first region 1010 and second region 1020, respectively, within which regions stress focusing is further illustrated by FIGS. 10D-10I. FIG. 10B shows a split axial view of the two cross-sections, wherein the left side indicates sectional lines 1010D and 1010E, corresponding to two partial sectional views of region 1010 (FIGS. 10D and 10E, respectively); and the right side indicates sectional lines 1020F and 1020G, corresponding to two partial sectional views of region 1020 (FIGS. 10F and 10G, respectively). FIGS. 10H and 10I are magnified views of the regions around corner 217 of region 1010, and curved portion 216 of region 1020, respectively, as shown smaller in FIGS. 10D and 10F.

The distinction sections for each of regions 1010 and 1020 demonstrate how, in some embodiments of the invention, a socket wall 1001 terminates differently distally at different wall sections; for example, according to whether the wall section is part of a socket corner, or is further toward the middle of the wall. Optionally, a straight-walled upper section meets a circular lower section, and there is a corresponding difference depending on whether the upper section diameter is wider than, narrower than, or the same as the lower section at each radial point of correspondence. In particular, such a difference distinguishes the corner cross-sectional views of FIGS. 10D and 10F from the mid-wall cross-sectional views of FIGS. 10E and 10G.

In some implant designs, forces, for example, forces loaded onto the abutment, are transferred along the socket wall until they reach the regions defined by corner 217 and/or curve 216. Corner 217 represents an abrupt change of wall orientation where a lower wall part 1005 and an upper wall part 1003 meet. Curved portion 216 joins the two wall parts through a more gradual change of slope. Optionally, lower wall part 1005 is formed as part of a chamfer 215 (FIG. 4A) leading in to a threaded abutment screw receiving bore. Optionally, upper wall part 1003 is part of a guide hole, cleaning and/or chip freeing hole, and/or chip-receiving hole which is formed as part of the manufacturing process of the socket wall 1001.

Turning now to FIGS. 10H and 10I, a difference in stress focusing patterns between a corner 217 and a curve 216 is described. Potentially, a sharply angled corner 217 provides no structural feature which can absorb the transfer of stress from other portions of the implant assembly 100 until the corner 217 itself is abruptly arrived at. Potentially, this results in sharply gradated stress/strain pattern schematically and qualitatively indicated by concentric rings 1041. The actual gradient of stress and strain generated is generally not in the form indicated, since it depends on the particular arrangement of forces, which can, for example, compress one part of the corner region while stretching another part. Nevertheless, the deforming forces which do develop are potentially most severe and/or focused within ring 1041E, close to the corner point 217, with gradually decreasing maximum forces exerted through rings 1041D, 1041C, 1041B, and 1041A.

In FIG. 10I, the more gradual sloping of curved region 216 acts to "catch" some of the force which transfers into the region, so that stress and strain are distributed over a wider area 1042. For example, a longitudinal change of angle of 15° occurs along a wall distance of at least about 38 µm, as noted above. This concept is illustrated in FIG. 10I, which shows that curve 216 may be viewed as having a plurality of portions, for example, $P_1$ and $P_2$. For portion $P_1$, for example, it can be seen that the ends of portion $P_1$ each have an associated angular orientation relative to the implant longitudinal axis 201 (FIG. 3A), and the angular orientations of the ends of portion $P_1$ differ by 15°, and a distance Li along the bore wall between said first and second ends of $P_1$ is at least 38 µm. For the curve 216, this corresponds to a net decrease of peak force exerted, potentially resulting in reduction of peak stress/strain. For example, the maximum force exerted anywhere within the ring 1042C is potentially no greater than the maximum force occurring between rings 1041C and 1041D—and no region experiences a force as great as that experienced at some points within rings 1041D and/or 1041E.

Although stress focusing at corners is a well-known phenomenon in structural analysis, it is not generally desirable, from a point of view of economical manufacture and/or device function to simply remove all corners from an item of manufacture. Moreover, in actual practice, a corner may or may not turn out to be a point of failure. Actual determination of this is potentially left to directed testing, modeling, and/or experience with the device under conditions of use. For example, in the case of small-diameter implants, to be manufactured as part of an abutment-sharing range of implant sizes including medium- and large-diameter implants, it has been empirically found that a transition from "strong enough" to "at failure risk" for the particular region of curve 216 can occur within a particular diameter range—for example, in a range between a medium-diameter implant having an outer diameter of 3.75 mm, and a small-diameter implant having an outer diameter of 3.3 mm, or in another diameter range.

It should be noticed that curve 216 in FIG. 10F extends to wall portion 1003, terminating proximally at a proximal-facing horizontal ledge surface, which itself forms another corner with wall surface 1001. Although the wall rising from the ledge corner is thinner, the observed point of failure has been found to be at the corner point lower down. Potentially, the ledge corner is shielded from stress focusing by other portions of the socket wall, for example, the full-thickness region shown in the cross section of FIG. 10G, and/or by mutual support provided by two walls meeting at the corner. Potentially, protecting the upper corner is less important to the stress performance of the implant than protecting the lower corner, consistent with an observed pattern of implant stress failures. Nevertheless, in some embodiments, a curved region formed as described for curve 216 is optionally or alternatively provided along at least a section of the ledge region.

Reference is now made to FIG. 1, which is a simplified pictorial illustration of a dental implant assembly 100 with an internal connection platform, including a dental implant 200 connected to an abutment 300 by an abutment screw 400, shown within a jawbone 500 of a patient, according to some exemplary embodiments of the invention.

In some embodiments, dental implant assemblies 100 include dental implants 200 of outer diameters varying, for example, from 3.3 mm to 6 mm, or having another larger or smaller diameter. Different diameters of a dental implant in the prior art typically correspond to a differently sized matching abutment and/or matching abutment screw. Potentially, this increases the variety of abutments and abutment screws needed.

Several groups of dental implants 200 may be characterized by diameter into groups. For example, a group of small-diameter dental implants having a diameter of about 3.3 mm, a group of medium-diameter dental implants having a diameter of about 3.75 mm and a group of large-diameter implants having a diameter of about 5 mm. Examples of dental implant assemblies having different outer diameters are also shown in and described in relation to FIGS. 8A-9C herein. In some embodiments of the invention, a medium-diameter implant is at least 0.45 mm larger in outer diameter than a corresponding small-diameter dental implant. Optionally or alternatively, the difference in diameter is, for example, at least 0.3 mm, 0.35 mm, 0.4 mm, 0.5 mm, or another larger, smaller, and/or intermediate difference in diameter. In some embodiments of the invention, a large-diameter implant is at least 1.7 mm larger in outer diameter than a corresponding small-diameter dental implant. Optionally or alternatively, the difference in diameter is, for example, at least 1.4 mm, 1.5 mm, 1.8 mm, 2.0 mm, 2.7 mm, or another larger, smaller, and/or intermediate difference in diameter.

In some embodiments of the invention, a curved portion 216 is particularly provided with small-diameter dental implants. In some embodiments, a small-diameter implant has an outer diameter (measured at the proximal end of the implant) other than 3.3 mm; for example, a diameter of 3.20 mm, 3.25 mm, 3.35 mm, 3.40 mm, 3.45 mm, 3.5 mm, or another larger, smaller, or intermediate outer diameter. Optionally, a curved portion 216 is provided with an intermediate-diameter and/or larger-diameter implant.

Figure 2:
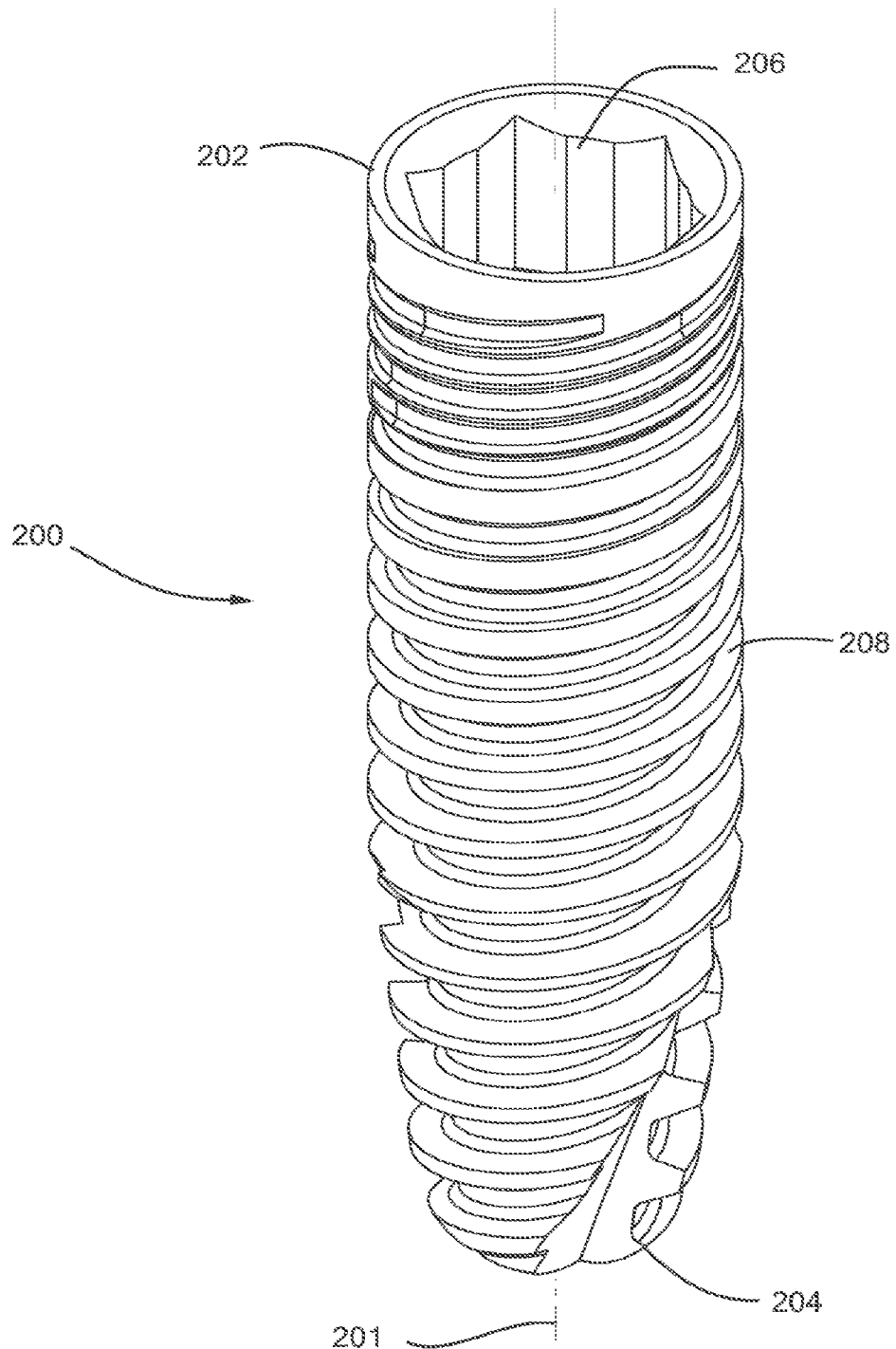
FIG. 2 schematically illustrates in isometric view a dental implant constructed and operative in accordance to an embodiment of the present invention, according to some exemplary embodiments of the invention.

Reference is now made to FIG. 2, which is a simplified isometric view illustration of dental implant 200, according to some exemplary embodiments of the present invention. Further reference is made to FIGS. 3A and 3B, which are simplified plan views of the dental implant 200 of FIG. 2, showing the dental implant 200 from the side and from the proximal end respectively, according to some exemplary embodiments of the invention.

An exemplary small-diameter dental implant 200 is seen in FIG. 2. The dental implant 200 is produced, for example, as an integral part made of titanium or titanium alloy. In general form, implant 200 is cylindrical and/or slightly conical. Optionally, most features of implant 200 are symmetric about a longitudinal axis 201 (threading such as threading 208, for example, is not strictly symmetric, but also follows the generally cylindrical/conical plan of the implant body). The dental-implant 200 has a proximal end 202 and a distal end 204. The internal connection platform of the implant comprises a socket, for example, hexagonal socket 206, for insertion of abutment 300 therein. Socket 206 is formed at the proximal end 202 of the dental implant 200 and extends distally towards the distal end 204. Dental implant 200 has a threaded outer surface 208 for threaded insertion thereof into a pre-drilled hole within the jawbone 500 of a patient.

The dental implant 200, in accordance with some exemplary embodiments of the present invention, has an outer diameter of 3.3 mm at its proximal end 202. Optionally, it is of any length suitable for implantation within a jaw; for example, a length in the range of 10 mm-16 mm, or another longer or shorter length.

It should be understood that any type of dental implant 200 is optionally employed in some embodiments of the present invention, for example, a conical dental implant, a cylindrical dental implant or any other type of dental implant with an internal connection platform.

Figure 3A:
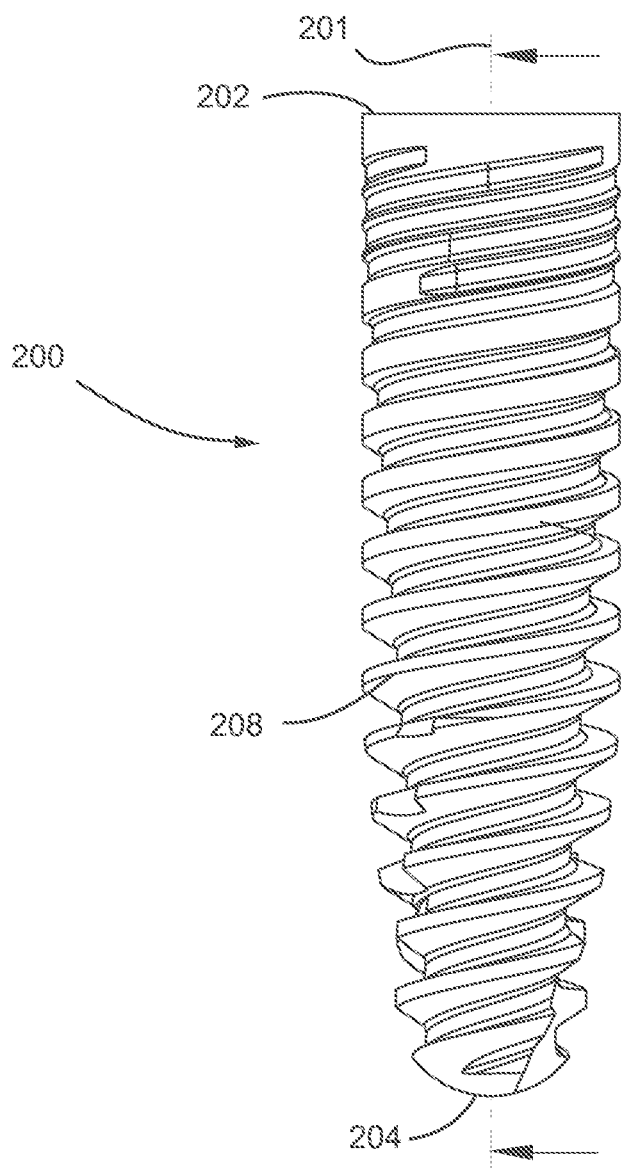
FIG. 3A is a schematic plan view of the dental implant of FIG. 2, showing the dental implant from the side, according to some exemplary embodiments of the invention.
Figure 3B:
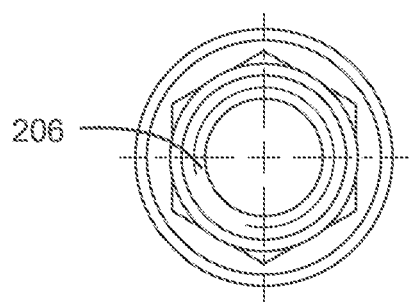
FIG. 3B is a schematic plan view of the dental implant of FIG. 2, showing the dental implant from the proximal end, according to some exemplary embodiments of the invention.
Figure 4A:
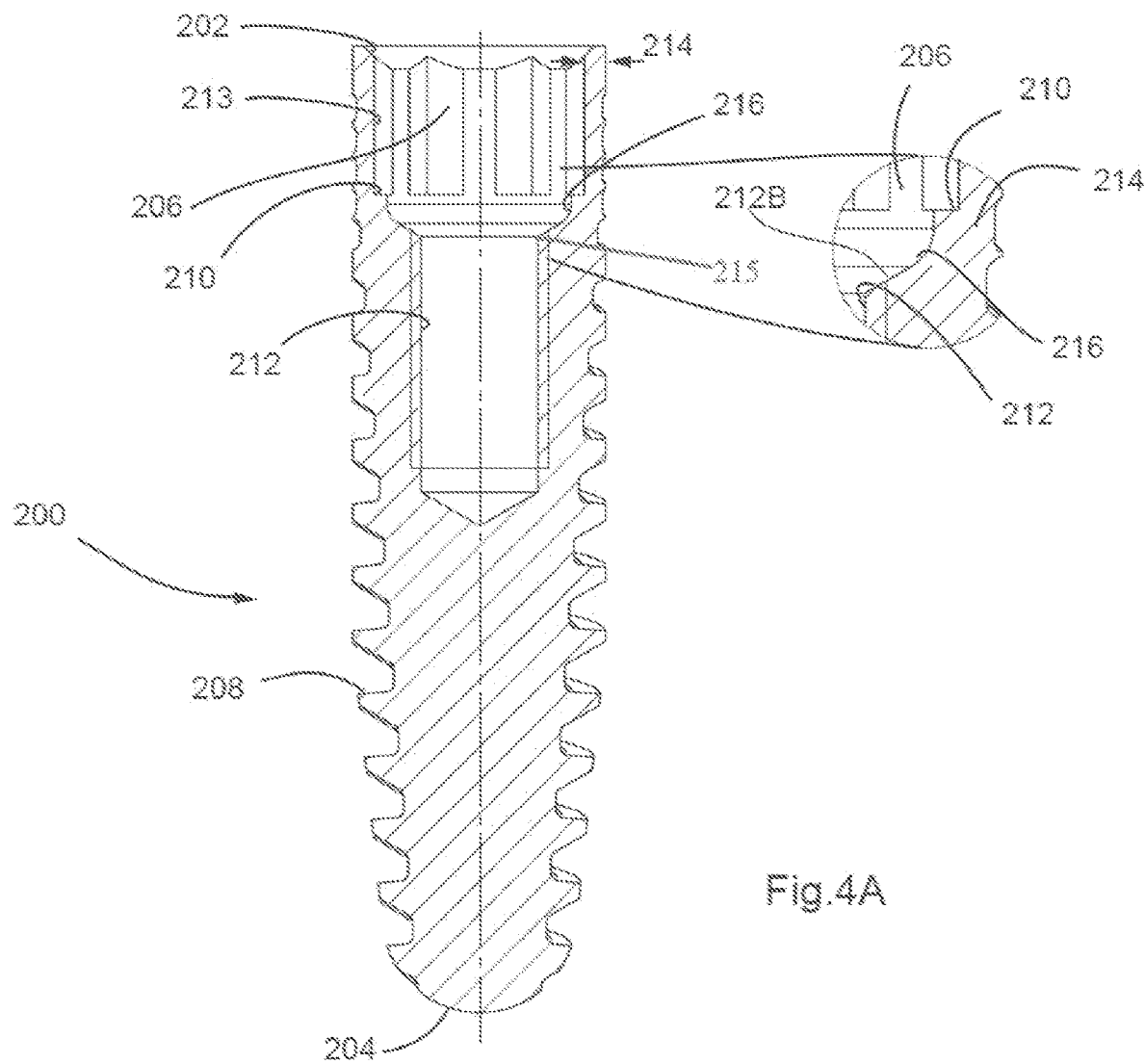
FIG. 4A is a schematic section view of the dental implant with enlargement, the section being taken along line A-A in FIG. 3A, according to some exemplary embodiments of the invention.
Figure 4B:
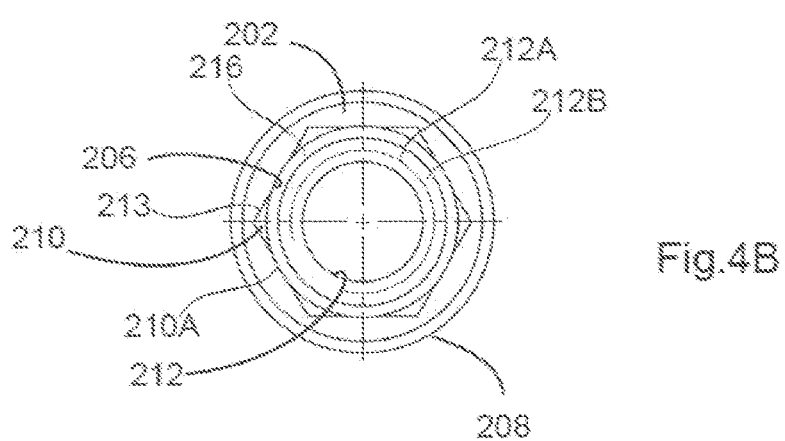
FIG. 4B is a schematic plan view of the dental implant, shown from the proximal end, according to some exemplary embodiments of the invention.

Reference is now made to FIGS. 4A and 4B, which are simplified section view of the dental implant 200 with enlargement and plan view shown from the proximal end 202 respectively, section being taken along lines A-A in FIG. 3A, according to some exemplary embodiments of the invention.

FIGS. 4A and 4B show hexagonal socket 206 extending distally from the proximal end 202 to a proximally facing shoulder 210 and joined to an internally threaded hole 212 extending distally from a region distal to the hexagonal socket 206. The hexagonal socket 206 formed at the proximal end 202 of the dental implant 200 has an inner surface 213. A wall thickness 214 is defined between the inner surface 213 of the hexagonal socket and the outer surface 208 at the proximal end 202 of the dental implant 200.

It should be noted that in some embodiments, a cylindrical surface 210A which defines the inner extent of shoulder 210 optionally is sized to create a slight bulge near the center region of each face of socket inner surface 213. In some embodiments, this reflects the broaching technique used to form the socket 206: surface 210A is the diameter of a guide hole, for example, while the rest of socket inner surface 213 is defined by the cutting edges of the broaching tool. Optionally, surface 201A is formed by another tool after broaching, for example in cleaning/freeing the broaching chips from the hole, and/or for formation of curved portion 216.

It is a common practice that for a small-diameter dental implant 200, as illustrated in FIGS. 4A and 4B having an outer diameter of 3.3 mm, a relatively small-diameter abutment 300 is used in order to provide for a wall thickness 214 of at least 0.5 mm. As a result, a relatively small-diameter abutment screw 400 is used in order to connect the dental implant 200 and the abutment 300. This relatively small-diameter abutment screw 400 is, however, potentially insufficient for reliable connection between the dental implant 200 and the abutment 300 and may in turn cause to pre-term failure of the dental implant assembly 100. This risk to reliability when using small abutments is also a reason, when providing a common abutment and abutment screw size for use with a family of implants covering a range of outer diameters, to adjust the wall thickness of the smallest implant, rather than adjust the larger implants for use with smaller abutment hardware.

It is a particular feature of some embodiments of the present invention that a curved portion 216 is formed between the proximally facing shoulder 210 of the hexagonal socket 206 and the internally threaded hole 212 and joins therebetween. Optionally, the curved portion 216 has a radius curvature of about 0.3 mm. Optionally the curved portion 216 curves with a another radius of curvature; for example, about 150 μm, 200 μm, 250 μm, 400 μm, 500 μm, or another larger, smaller, or intermediate radius of curvature. Optionally, the curvature follows a non-circular curve, for example, an elliptical, parabolic, hyperbolic, and/or parametric polynomial curve.

In some embodiments of the invention, the curved portion is formed by use of a corner-radiused end mill ("bull nose" mill); for example, a mill which is substantially of the radius of the cylindrical surface 210A along its body, with a curvature corresponding to the curvature of curved portion 216 defined at the edges of the mill end. A potential benefit of using a bull nose mill is that a single longitudinal pass is potentially sufficient to mill the shape of curved portion 216 along the bore of the internal connection platform.

In some embodiments, a ball nose mill is used to define curved portion 216. For example, a ball nose mill having an end radius corresponding to the curvature of curved portion 216 is moved around the perimeter of surface 210A to cut the curved portion 216. Optionally, this is done only at selected sections of the perimeter, for example to reduce machining time.

Additionally or alternatively, the shape of curved portion 216 is built into a chamfering bit used to form a sloped region 212B which leads into the internally threaded hole 212. Additionally or alternatively, another tooling arrangement is used to form curved region 216.

Optionally, formation of curved region 216 is performed along with a tool pass used to free and/or clean chips formed during the formation of socket surface 213.

A potential advantage of curved portion 216 is the prevention of excessive stress concentration at the circumference of the hexagonal socket 206. Optionally, this allows preservation of a wider inner diameter of the socket (for example, an inner diameter corresponding to a standard socket inner diameter). In some embodiments, the inner diameter of hexagonal socket 206 is set to about 2.44 mm (optionally, 2.44 mm with a tolerance of, for example, ±0.01 mm or less) by forming wall thickness 214 to about 0.29 mm (optionally, 0.29 mm with a tolerance of, for example, ±0.01 mm or less). Potentially, curved portion 216 removes a region of primary stress failure which would otherwise occur due to the thinned wall. For example, the wall portion is sufficiently strengthened so that stress failure, if it occurs, is transferred to another portion of the implant assembly (e.g., another portion of the implant, abutment, abutments screw, and/or jawbone in which the implant is secured).

It is an additional particular feature of some embodiments of the present invention that forming the curved portion 216 between the hexagonal socket 206 and the internally threaded hole 212 facilitates using of a single diameter abutment 300 and/or a single diameter abutment screw 400 for a range of outer diameters of dental implant 200 by substantially reducing stress concentration along a vulnerable portion of the perimeter of the hexagonal socket 206. More particularly, a standard diameter abutment 300, having an outer diameter of, for example, about 2.44 mm (optionally, 2.44 mm with a tolerance of, for example, ±0.01 mm or less) is used with every provided dental implant 200 in the range, including a small-diameter dental implant having an outer diameter of, for example, about 3.3 mm or less (optionally, 3.3 mm with a tolerance of about ±0.01 mm or less). Optionally, the diameter is measured in the region of the proximal end of the implant, for example, the extreme proximal end, and/or the largest diameter in the region of the proximal end. Where there is ambiguity as to which diameter this identifies, the region of the proximal end is optionally defined, for example, as comprising a region proximal to the primary set of bone-engaging threads (the set of threads that continuously extends to the distal end of the implant).

Figure 5A:
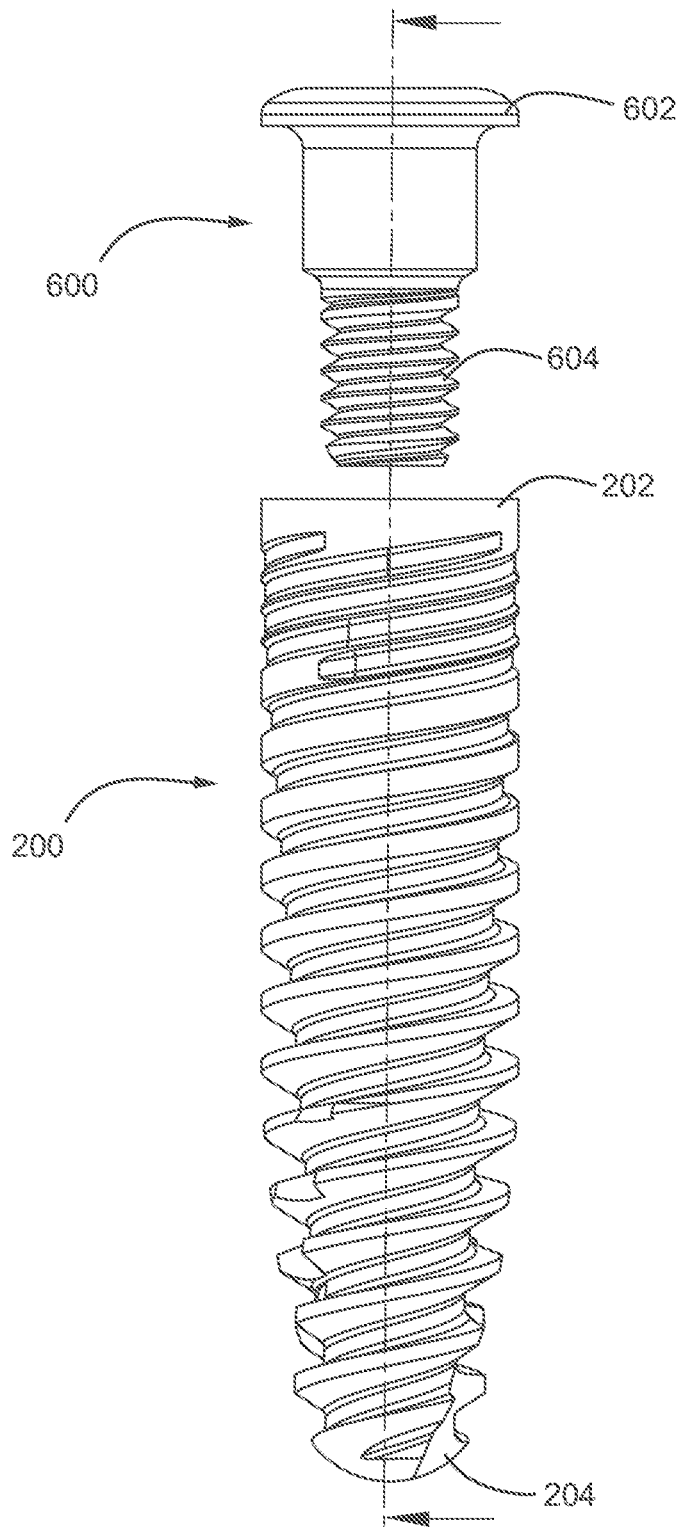
FIG. 5A is a simplified exploded view illustration showing the dental implant of FIG. 2 with a cap screw, according to some exemplary embodiments of the invention.
Figure 5B:
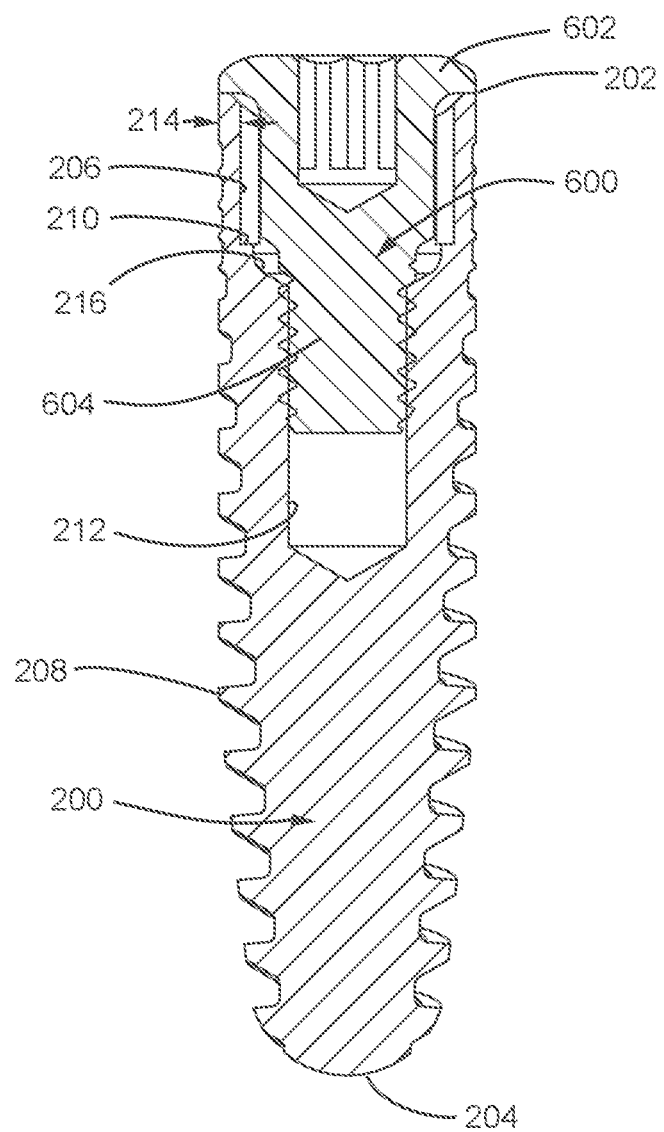
FIG. 5B is a simplified sectional view of the cap screw connected to the dental implant, the section being taken along line B-B of FIG. 5A, according to some exemplary embodiments of the invention.

Reference is now made to FIG. 5A, which is a simplified exploded view illustration showing the dental implant 200 of FIG. 2 with a cap screw 600 and to FIG. 5B, which is a simplified sectional view of the cap screw 600 connected to the dental implant 200, section being taken along lines B-B in FIG. 5A, according to some exemplary embodiments of the invention.

Optionally, for example in two-stage procedures, cap screw 600 is connected to the dental implant 200; for example in order to allow to reduce a risk of infection during a period in which the jawbone 500 heals after dental implant 200 is inserted therein.

In some embodiments cap screw 600 has a distal cap portion 602 with an outer diameter corresponding to the outer diameter of the proximal portion 202. For example, distal cap portion with an outer diameter of 3.3 mm mates with the outer diameter of the proximal portion 202 of a small-diameter dental implant 200. Cap screw 600 moreover comprises a proximal portion 604 that is registered with the internally threaded hole 212 of the dental implant 200.

It is a particular feature of an embodiment of the present invention that a cap screw with a standard diameter in the threaded region can be connected to the small-diameter dental implant having an outer diameter of 3.3 mm, or another outer diameter such as 3.1 mm, 3.2 mm, 3.25 mm, 3.35 mm, 3.40 mm, 3.5 mm, or another larger or smaller outer diameter. Resistance to fatigue, stress, and/or strain failure is potentially conferred by to the curved portion 216, as described in detail, for example in relation to FIGS. 4A-4B and an abutment. The curved portion 216 mitigates stress concentration near the circumference of the hexagonal socket 206, potentially allowing a sufficient wall strength to prevent breakage of the dental implant even with a thin wall thickness, for example, a thickness of about 0.29 mm, or another thickness such as 0.20 mm, 0.25 mm, 0.30 mm, 0.35 mm, 0.40 mm, or another greater, smaller, and/or intermediate wall thickness. Although the cap screw cap portion 602 is in general sized to the particular diameter of the implant, it is a potential advantage for the portion of the cap screw that interacts with the internal connection platform to share manufacturing steps and/or tooling in common with cap screws for other abutment sizes. Optionally, a cap portion 602 sized for use with a smaller implant is used with a larger implant, or vice versa.

Figure 6:
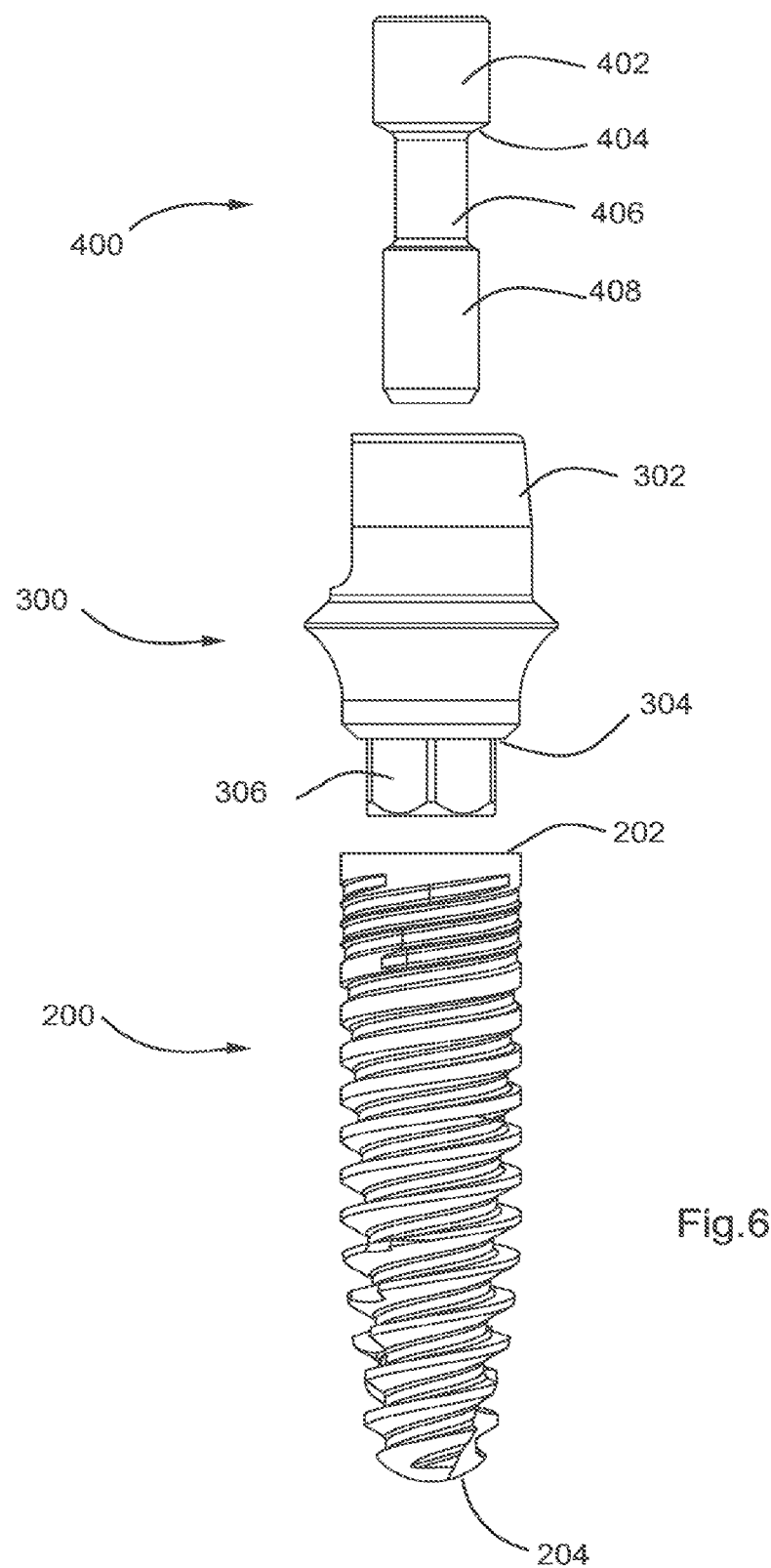
FIG. 6 is a simplified exploded view illustration of the dental implant assembly showing the dental implant of FIG. 2, the abutment and the abutment screw, according to some exemplary embodiments of the invention.
Figure 7A:
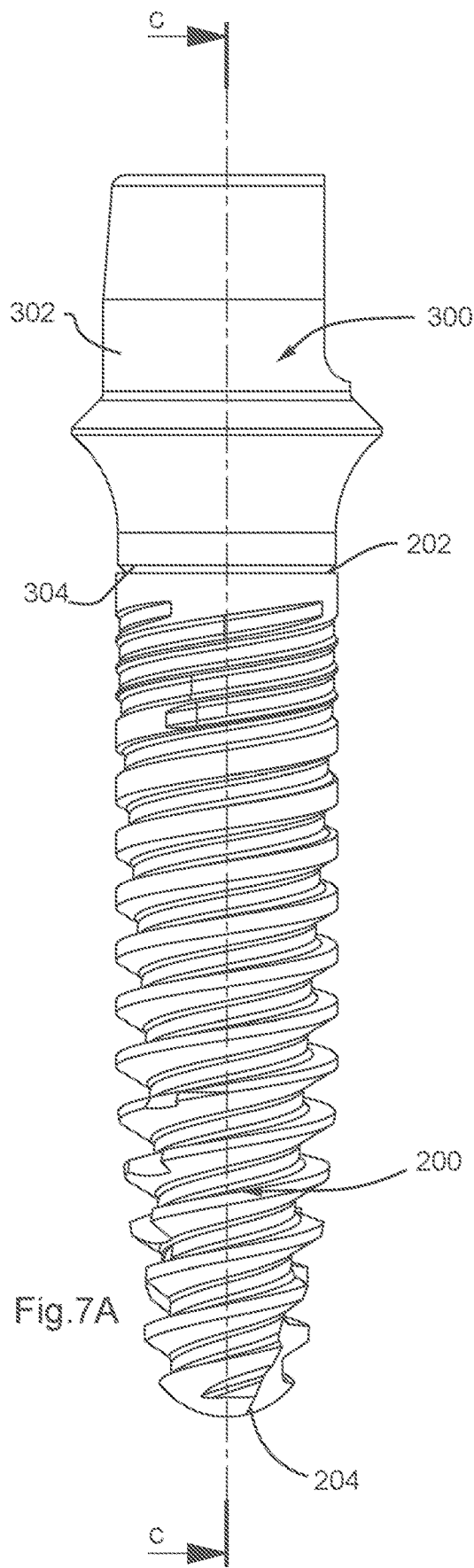
FIG. 7A is a simplified assembled view of the dental implant assembly, according to some exemplary embodiments of the invention.
Figure 7B:
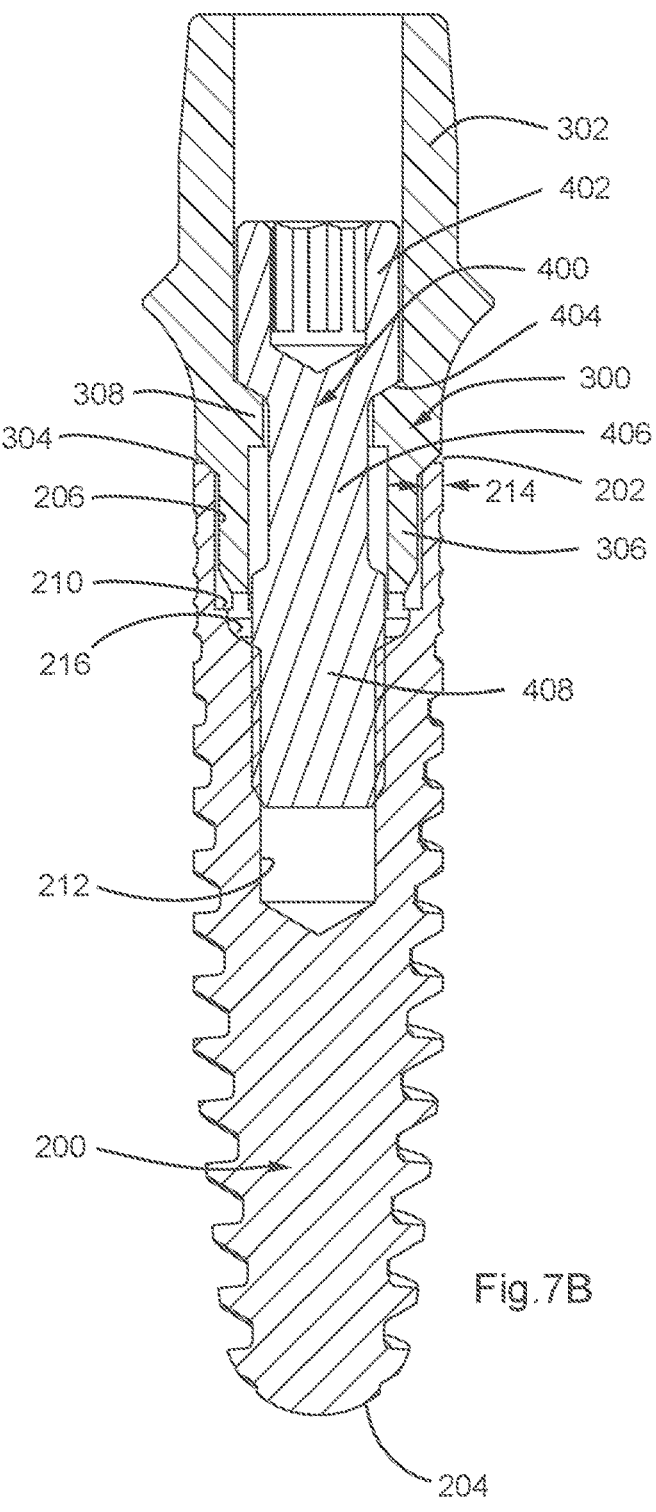
FIG. 7B is a simplified sectional view of the dental implant assembly of FIG. 7A, the section being taken along line C-C in FIG. 7A, according to some exemplary embodiments of the invention.

Reference is now made to FIG. 6, which is a simplified exploded view illustration of the dental implant assembly 100 showing the dental implant 200 of FIG. 2, the abutment 300 and the abutment screw 400, according to some exemplary embodiments of the invention. Reference is additionally made to FIG. 7A, which is a simplified assembled view of the dental implant assembly 100 and to FIG. 7B, which is a simplified sectional view of the dental implant assembly 100 of FIG. 7A, section being taken along line C-C in FIG. 7A, according to some exemplary embodiments of the invention.

In some embodiments, for example at a second stage of the procedure, permanent abutment 300 is connected to the dental implant 200 using abutment screw 400. In some embodiments, cap screw 600 must first be removed.

In some embodiments, the abutment 300 has a proximal portion 302 defining a distally facing shoulder 304 that is configured to be seated on the proximal end of the dental implant 200. The abutment 300 further has a distal portion 306 that is shaped for insertion into the socket 206 of the dental implant 200. For example, distal portion 306 and socket 206 both comprise generally hexagonal cross sections which fittingly insert one into the other.

In some embodiments, abutment 300 is internally hollow, and defines an internally protruding annular flange 308 on its inner circumference acting as a stopper for the abutment screw 400. Abutment screw 400 has a proximal portion 402 ending at a slightly proximally tapered distally facing surface 404 adapted to be seated on the flange 308 of the abutment 300.

Abutment screw 400 additionally has an intermediate portion 406 extending distally from the proximal portion 402, and an outwardly threaded distal portion 408 adapted to be registered with the internally threaded hole 212 of the dental implant 200, and connect between the abutment 300 and the dental implant 200.

It is a particular feature of some embodiments of the present invention that a standard size abutment 300 (standard, that is, according to a standard of the art of dental implants, and/or according to a standard defined for a full range of implants having different outer diameters) is employed for use with a small diameter dental implant 200 having a (largest and/or proximal) outer diameter of 3.3 mm or less. For example, hexagonal portion 306 of the abutment comprises an outer diameter (face-to-face) of approximately 2.42 mm. The abutment is furthermore used with a matching standard size abutment screw 400.

Reliable use of a standard abutment throughout a range comprising even a small-diameter, thin-walled abutment is potentially enabled, in some embodiments, by the use of curved portion 216 of the dental implant 200.

Figure 8A:
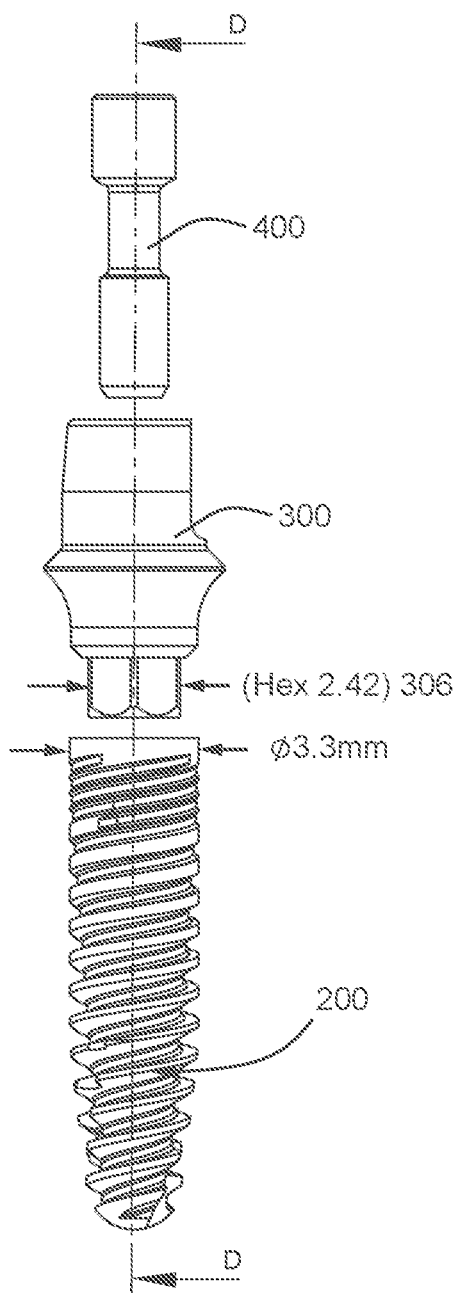
FIG. 8A is a simplified exploded view illustration of a small-diameter dental implant of FIG. 2 with the abutment and abutment screw, according to some exemplary embodiments of the invention.
Figure 8B:
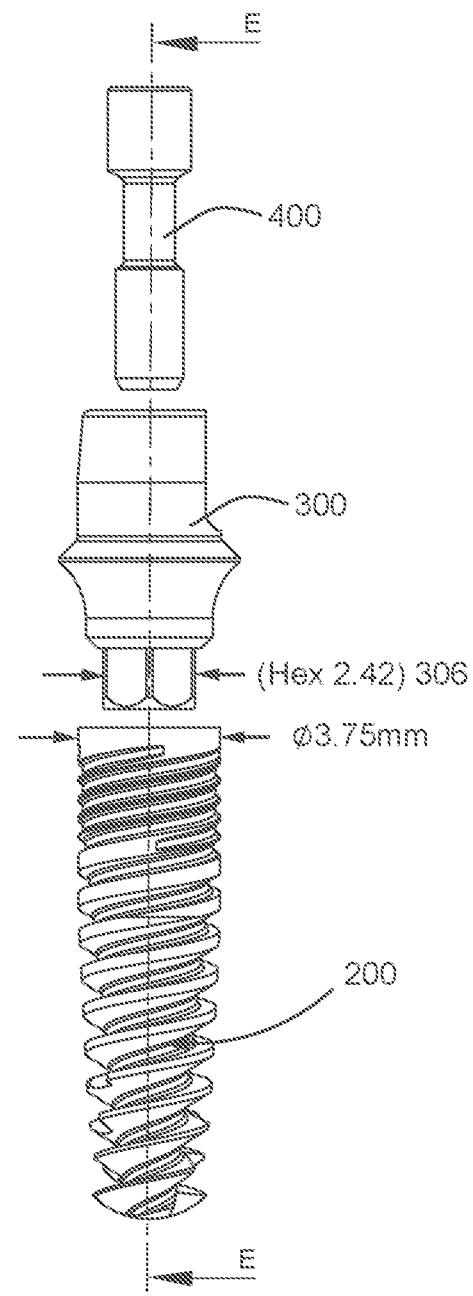
FIG. 8B is a simplified exploded view illustration of a medium-diameter dental implant of FIG. 2 with the abutment and abutment screw, according to some exemplary embodiments of the invention.
Figure 8C:
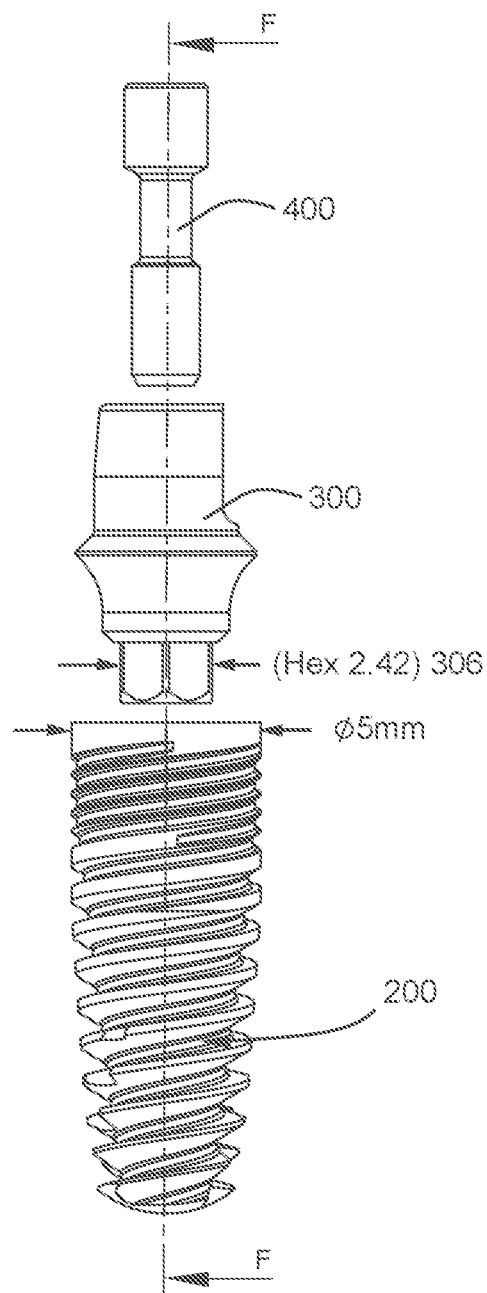
FIG. 8C is a simplified exploded view illustration of a large-diameter dental implant of FIG. 2 with the abutment and abutment screw, according to some exemplary embodiments of the invention.
Figure 9A:
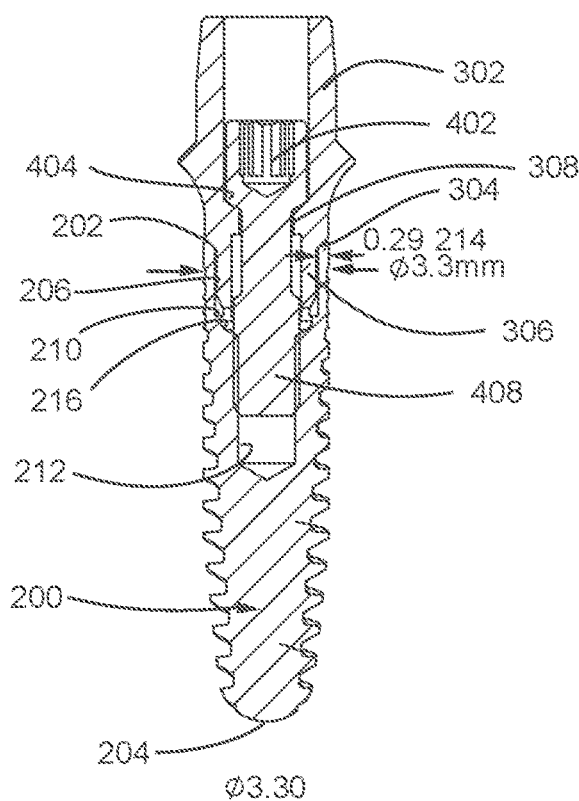
FIG. 9A is a simplified sectional view of the assembled dental implant assembly of FIG. 8A, the section being taken along lines D-D in FIG. 8A, according to some exemplary embodiments of the invention.
Figure 9B:
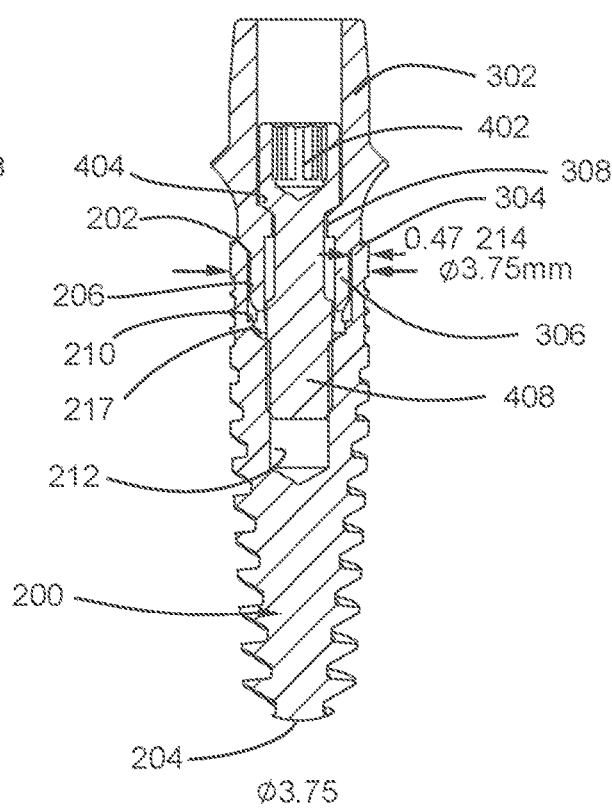
FIG. 9B is a simplified sectional view of the assembled dental implant assembly of FIG. 8B, the section being taken along lines EE in FIG. 8B, according to some exemplary embodiments of the invention.
Figure 9C:
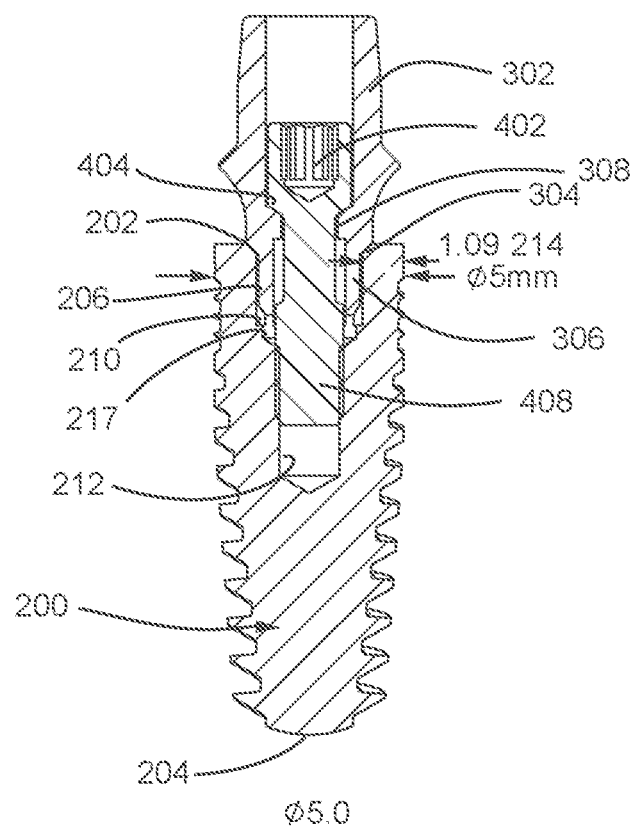
FIG. 9C is a simplified sectional view of the assembled dental implant assembly of FIG. 8C, the section being taken along lines F-F in FIG. 8C, according to some exemplary embodiments of the invention.

Reference is now made to FIGS. 8A-8C, which are simplified exploded view illustrations of the small-diameter dental implant 200 of FIG. 2 with the abutment 300 and abutment screw 400, a medium-diameter dental implant 200 with the abutment 300 and abutment screw 400 and a large-diameter dental implant 200 with the abutment 300 and abutment screw 400 respectively, according to some exemplary embodiments of the invention. Reference is additionally made to FIGS. 9A-9C, which are simplified sectional views of the assembled dental implant assemblies 100 of FIGS. 8A-8C respectively, sections being taken along lines D-D in FIG. 8A, E-E in FIG. 8B and F-F in FIG. 8C, according to some exemplary embodiments of the invention.

A comparison between three different exemplary dental implants 200 having a different outer diameter are shown in FIGS. 8A-8C and FIGS. 9A-9C respectively.

FIGS. 8C and 9C show a large-diameter dental implant, having, in this example, a diameter of 5 mm at its proximal end 202. When connecting a standard size abutment 300 (having a hexagon portion 306 diameter of, for example, 2.42 mm) to the dental implant 200 shown in FIGS. 8C and 9C, the wall thickness 214 remaining at the circumference of the hexagonal socket 206 of the dental implant 200 is about, for example, 1.09 mm. This wall thickness potentially provides for a very reliable dental implant assembly 100. For example, the wall thickness is enough to withstand the degree of stress concentration which is potentially created at the circumference of hexagonal socket 206 of the dental implant 200.

FIGS. 8B and 9B show the medium-diameter dental implant, having a diameter of, for example, 3.75 mm at its proximal end 202. When connecting a standard size abutment 300, having a hexagon portion 306 diameter of, for example, 2.42 mm to the dental implant 200 shown in FIGS. 8B and 9B, the wall thickness 214 remaining at the circumference of the hexagonal socket 206 of the dental implant 200 is, for example, about 0.47 mm. This wall-thickness still provides for a reliable dental implant assembly 100, as a relatively small amount of stress concentration is created at the circumference of hexagonal socket 206 of the dental implant 200, relative to the strength of the wall itself. For example, the wall thickness is enough to withstand the degree of stress concentration which is potentially created at the circumference of hexagonal socket 206 of the dental implant 200.

FIGS. 8A and 9A show the small-diameter dental implant, having a diameter of, for example, 3.3 mm at its proximal end 202. When connecting a standard size abutment 300, having a hexagon portion 306 diameter of, for example, 2.42 mm, to the dental implant 200 shown in FIGS. 8A and 9A, the wall thickness 214 remaining at the circumference of the hexagonal socket 206 of the dental implant 200 is about, for example, 0.29 mm. Without modification to the dental implant 200, this wall thickness is potentially at significant risk of failure when experiencing the same amount of forces which the larger diameter dental implants 200 are able to withstand. In one possible failure scenario, excessive stress concentration is created at the circumference of hexagonal socket 206 of the dental implant 200.

A particular feature of some embodiments of the present invention is that curved portion 216 is created adjacent and slightly distally to the hexagonal socket 206 of the dental implant. In some embodiments, the curved portion has an average radius of curvature of 0.3 mm (optionally, another radius, for example 0.15 mm, 0.2 mm, 0.35 mm, or another larger or smaller radius). In some embodiments, the radius strengthens the dental implant 200 by substantially preventing failure inducing stress concentration along the perimeter of the hexagonal socket 206. As a potential result, small-diameter dental implant 200 with wall-thickness 214 of 0.29 mm can withstand at least the same amount of forces as medium or large-diameter dental implants 200 with wall thickness 214 of 0.47 mm and 1.09 mm respectively. Particularly, a small-diameter dental implant 200 with a provided curved portion 216 is adapted thereby to withstand approximately 340 N·cm, or another force similar to the forces that medium or large-diameter dental implants 200 can withstand. In some embodiments, small-diameter dental implant 200 is designed (for example, by substitution of materials, adjustment of outer diameter, and/or adjustment of the connection platform inner diameter of all the implants) and/or tested to withstand another force, at a level of performance which is reached due to the provision of curved section 216. For example, the implant withstands a force of 300 N·cm, 400 N·cm, 450 N·cm, 500 N·cm, 550 N·cm, 600 N·cm, 650 N·cm, or another larger, smaller, and/or intermediate force.

As used herein with reference to quantity or value, the term "about" means "within ±10% of".

The terms "comprises", "comprising", "includes", "including", "having" and their conjugates mean: "including but not limited to".

The term "consisting of" means: "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

The words "example" and "exemplary" are used herein to mean "serving as an example, instance or illustration". Any embodiment described as an "example" or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features except insofar as such features conflict.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

Throughout this application, embodiments of this invention may be presented with reference to a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A dental implant having a generally cylindrical or conical body and a bore extending distally along a longitudinal axis of the implant into the body from a proximal end of the body;
the bore having a bore wall defining:
a socket region,
an internally threaded hole distal to and radially inset from a wall of the socket region, and
an interface portion between the socket region and the internally threaded hole, said interface portion including a first section distal to said socket region and a second section contacting said internally threaded hole and being proximal thereto;
wherein a shape of the interface portion comprises a change in angle from an orientation along said bore axis at a proximal side of the interface portion to an orientation at a distal side of the interface portion;
wherein said interface portion has a cross-sectional profile including a curve having a plurality of portions, wherein each portion of the cross-sectional profile includes first and second ends each having an associated angular orientation of a tangent to the curve defined by the interface section of the wall at that end, relative to said implant longitudinal axis, wherein said angular orientations of the tangents to the curve at said first and second ends differ by 15° and a distance along the bore wall between said first and second ends is at least 38 µm;
wherein the change in angle is distributed along the longitudinal axis and within a longitudinal plane containing the longitudinal axis; and
wherein the extent of the distribution is sufficient to reduce stress concentration for prevention of primary stress failure at a region of wall between the socket region and the internally threaded hole.

2. The dental implant of claim 1, wherein the length along the bore wall is at least 77 µm.

3. The dental implant of claim 1, wherein a magnitude of the change in angle of the interface portion is between 15° and 85°.

4. The dental implant of claim 3, wherein magnitude of the change in angle is no more than 75°.

5. The dental implant of claim 1, wherein the interface portion directly connects a bore wall portion extending along the longitudinal axis with the slope of a chamfer leading distally into the internally threaded hole.

6. The dental implant of claim 1, wherein the shape comprising the change of angle is curved, and the radius of curvature is sufficient to strengthen said implant to withstand a force at said interface portion of at least 300N.

7. The dental implant of claim 6, wherein the radius of curvature is at least 150 µm for each section of wall which is at least 26 µm long.

8. The dental implant of claim 1, wherein the shape comprising the change of angle is curved, and the radius of curvature is one of at least 150 µm and at least 300 µm.

9. The dental implant of claim 8, wherein the radius of curvature is at least 300 µm for each section of wall which is at least 26 µm long.

10. The dental implant of claim 1, wherein a region of the change in angle is non-reversing with respect to a direction of change.

11. The dental implant of claim 1, wherein a length of a region of the change in angle has a radius of curvature which decreases with increasing longitudinal depth.

12. The dental implant of claim 1, wherein said socket region includes a plurality of wall portions disposed between corner portions, wherein said interface portion extends proximally from said internally threaded hole to said wall portions and to said corner portions.

13. The dental implant of claim 1, wherein said socket region has a diameter of 2.44 mm with a tolerance of ±0.01 mm.

14. The dental implant of claim 1, wherein a region of the change in angle is restricted to not more than 90° of a bore wall circumference.

15. The dental implant of claim 1, wherein a region of the change in angle is present around at least 270° of a bore wall circumference.

16. The dental implant of claim 1, wherein a region of the change in angle is present around between 90° and 270° of a bore wall circumference.

17. The implant of claim 1, having a wall thickness of less than 0.29 mm.

18. The implant of claim 1, wherein a change of angles between two adjacent linear segments in said interface portion is less than 15 degrees.

19. The implant of claim 1, wherein a change of angles between two adjacent linear segments in said interface portion is less than 10 degrees.

20. The implant of claim 1, wherein a change of angles between two adjacent linear segments in said interface portion is less than 5 degrees.

21. The implant of claim 1, wherein a difference in diameter between said socket region and said internally threaded hole is at least 0.2 mm.

22. The implant of claim 1, wherein a difference in diameter between said socket region and said internally threaded hole is at least 0.4 mm.

23. The dental implant of claim 1, wherein said dental implant has an outer diameter at said proximal side of said interface portion selected from 5 mm, 3.75 mm, and 3.3 mm.

24. A kit comprising a plurality of dental implants, each dental implant according to claim 1.

25. The kit according to claim 24, further including a set of abutment and abutment screw hardware which is compatible with each of said plurality of dental implants.

26. The dental implant of claim 1, wherein said range is from 3.3 to 3.75 mm.

27. The dental implant of claim 1, wherein said outer diameter at a proximal side of said interface portion is 3.3 mm.

28. The dental implant of claim 1, wherein said change in angle relative to said implant longitudinal axis is less than 90 degrees.

29. The dental implant of claim 1, wherein a region of the change in angle is restricted to less than 360 degrees of a bore wall circumference.

30. The dental implant of claim 1, wherein a portion of said bore has a hexagonal configuration and wherein said shape of said interface portion having said orientation along said bore axis is distal to said hexagonal portion of said socket region.

31. The dental implant of claim 1, wherein said socket region is configured to receive a hexagonal portion of an abutment, where said abutment has an outer diameter of 2.44 mm with a tolerance of ±0.01 mm, and said outer diameter at a proximal side of said interface portion is within a range of from 3.3 to 6 mm.

32. The dental implant of claim 31, wherein said abutment includes a hexagonal portion having an outer diameter of 2.44 mm at said hexagonal portion with a tolerance of ±0.01 mm, and said outer diameter of said implant at a proximal side of said interface portion is within a range of from 3.3 to 6 mm.

33. The dental implant of claim 1, wherein said cross-sectional profile of said interface portion is taken along the longitudinal axis, wherein for each of said plurality of portions:

the cross-sectional profile includes first and second ends each having an angular orientation relative to said implant longitudinal axis, wherein said angular orientations of said first and second ends differ by 15° and a distance along the bore wall between said first and second ends is at least 38 μm.

34. The dental implant of claim 1, wherein a region of change in angle is restricted to less than 360 degrees of a bore wall circumference.

* * * * *